(12) United States Patent
Watanabe

(10) Patent No.: US 7,043,099 B1
(45) Date of Patent: May 9, 2006

(54) DEVICE AND SYSTEM FOR PHASE CONJUGATE CONVERSION AND WAVELENGTH CONVERSION

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/386,847

(22) Filed: Aug. 31, 1999

(30) Foreign Application Priority Data

Aug. 31, 1998 (JP) .......................................... 10-244986

(51) Int. Cl.
*G07B 6/0626* (2006.01)

(52) U.S. Cl. ............................. 385/11; 385/31; 385/37
(58) Field of Classification Search .................. 385/15, 385/10, 24, 27, 31, 33, 37–39, 46, 42, 11, 385/122; 359/326, 174, 337, 332, 133, 180, 359/188, 124
See application file for complete search history.

(56) References Cited

U.S. PATENT DOCUMENTS

| | | | |
|---|---|---|---|
| 5,596,667 A | | 1/1997 | Watanabe |
| 5,798,853 A | | 8/1998 | Watanabe |
| 6,122,419 A | * | 9/2000 | Kurokawa .................... 385/31 |
| 6,307,984 B1 | * | 10/2001 | Watanabe .................... 385/24 |
| 6,366,376 B1 | * | 4/2002 | Miyata et al. ................. 398/79 |
| 6,411,413 B1 | * | 6/2002 | Bergano ...................... 359/133 |

FOREIGN PATENT DOCUMENTS

| | | |
|---|---|---|
| EP | 0 776 103 A2 | 5/1997 |
| EP | 0 828 178 A2 | 3/1998 |
| GB | 0776103 A2 * | 5/1997 |
| JP | 07098464 A * | 4/1995 |

OTHER PUBLICATIONS

S. Watanabe, et al., Polorisation–insensitive wavelength conversation and phase conjugation using bi–directional forward four–wave mixing in a lasing DFB–LD; Feb. 13, 1997; pp. 1–2.
European Patent Office; European Search Report; Apr. 15, 2003; pp. 1–4.

* cited by examiner

*Primary Examiner*—Michael P. Stafira
*Assistant Examiner*—Michael P Mooney
(74) *Attorney, Agent, or Firm*—Staas & Halsey LLP

(57) ABSTRACT

The device according to the present invention relates to phase conjugate conversion and wavelength conversion. This device includes a polarization beam splitter and a polarization maintaining fiber (PMF). The polarization beam splitter has first, second, and third ports. The first port is supplied with signal light including first and second polarization components respectively having first and second polarization planes orthogonal to each other, and with pump light. The first and second ports are coupled by the first polarization plane, and the first and third ports are coupled by the second polarization plane. The PMF has first and second ends, and has a polarization mode to be maintained between the first and second ends. The first end is optically connected to the second port so that the first polarization plane is adapted to the polarization mode, and the second end is optically connected to the third port so that the second polarization plane is adapted to the polarization mode. Converted light generated by four-wave mixing based on the signal light and the pump light in the PMF is output from the first port, so that the converted light can be taken out by an optical circulator.

33 Claims, 18 Drawing Sheets

DOWNSTREAM LINE ($\lambda_{1j}$)

UPSTREAM LINE ($\lambda_{2j}$)

DEVICE AND SYSTEM FOR PHASE CONJUGATE CONVERSION AND WAVELENGTH CONVERSION

BACKGROUND OF THE INVENTION

1. Field of the Invention

The present invention relates to a device and system for phase conjugate conversion and wavelength conversion.

2. Description of the Related Art

Owing to recent developments of low-loss silica optical fibers, various optical fiber communication systems each using such an optical fiber as a transmission line have been put to practical use. The optical fiber itself has a very wide band. However, a transmission capacity by the optical fiber is actually limited by a system design. The most important limitation is due to waveform distortion by chromatic dispersion occurring in the optical fiber. Further, the optical fiber attenuates an optical signal at a rate of about 0.2 dB/km, for example. Loss of the optical signal due to this attenuation has been compensated for by adopting an optical amplifier such as an erbium doped fiber amplifier (EDFA) that is a typical example.

The chromatic dispersion that is often referred to simply as dispersion is a phenomenon such that the group velocity of an optical signal in an optical fiber changes as a function of the wavelength (frequency) of the optical signal. In a standard single-mode fiber, for example, an optical signal having a longer wavelength propagates faster than an optical signal having a shorter wavelength in a wavelength region shorter than 1.3 µm, and the resultant dispersion is usually referred to as normal dispersion. In contrast, an optical signal having a shorter wavelength propagates faster than an optical signal having a longer wavelength in a wavelength region longer than 1.3 µm, and the resultant dispersion is usually referred to as anomalous dispersion.

In recent years, the nonlinearities of an optical fiber have received attention in association with an increase in optical signal power due to the use of an EDFA. The most serious nonlinearity that limits a transmission capacity is an optical Kerr effect occurring in an optical fiber. The optical Kerr effect is a phenomenon such that the refractive index of an optical fiber changes with the intensity of an optical signal. A change in the refractive index modulates the phase of an optical signal propagating in an optical fiber, resulting in the occurrence of frequency chirping which changes a signal spectrum. This phenomenon is known as self-phase modulation (SPM). Spectral broadening due to SPM occurs to cause further enlargement of the waveform distortion due to chromatic dispersion.

In this manner, the chromatic dispersion and the optical Kerr effect impart waveform distortion to an optical signal with an increase in transmission distance. Accordingly, to allow long-haul transmission by an optical fiber, the chromatic dispersion and the nonlinearity must be controlled, compensated, or suppressed.

As a technique for controlling the chromatic dispersion and the nonlinearity, the use of a regenerative repeater including an electronic circuit for a main signal is known. For example, a plurality of regenerative repeaters are arranged along a transmission line. Each regenerative repeater performs opto/electric conversion, regeneration, and electro/optic conversion in this order before the waveform distortion of an optical signal becomes excessive. However, this method has a problem that the regenerative repeater required is expensive and complicated, and that the electronic circuit included in the regenerative repeater limits the bit rate of a main signal.

As a technique for compensating for the chromatic dispersion and the nonlinearity, optical soliton is known. An optical signal pulse having an amplitude, pulse width, and peak power each accurately specified with respect to a given anomalous dispersion is generated, thereby balancing pulse compression due to both SPM induced by the optical Kerr effect and the anomalous dispersion and pulse broadening due to dispersion, so that an optical soliton propagates as maintaining its waveform.

As another technique for compensating for the chromatic dispersion and the nonlinearity, the application of optical phase conjugation is known. For example, a method for compensating for the chromatic dispersion of a transmission line has been proposed by Yariv et al. (A. Yariv, O. Fekete, and D. M. Pepper, "Compensation for channel dispersion by nonlinear optical phase conjugation" Opt. Lett., vol. 4, pp. 52–54, 1979). An optical signal is converted into phase conjugate light at the midpoint of a transmission line, and the waveform distortion due to chromatic dispersion in the front half of the transmission line is compensated by the waveform distortion due to chromatic dispersion in the rear half of the transmission line.

In particular, if the causes of phase fluctuations of electric fields at two points are identical with each other, and an environmental change inducing these causes is gentle during a light propagation time between the two points, the phase fluctuations can be compensated by locating a phase conjugator (phase conjugate light generator) at the midpoint between the two points (S. Watanabe, "Compensation of phase fluctuation in a transmission line by optical conjugation" Opt. Lett., vol. 17, pp. 1355–1357, 1992). Accordingly, the waveform distortion due to SPM can also be compensated by adopting the phase conjugator. However, in the case that the optical power distributions on the upstream and downstream sides of the phase conjugator are asymmetrical with respect thereto, the compensation for nonlinearity becomes incomplete.

The present inventor has proposed a technique for overcoming the incompleteness of the compensation due to the asymmetry of optical powers in the case of using a phase conjugator (S. Watanabe and M. Shirasaki, "Exact compensation for both chromatic dispersion and Kerr effect in a transmission fiber using optical phase conjugation" J. Lightwave Technol., vol. 14, pp. 243–248, 1996). The phase conjugator is located in the vicinity of a point on a transmission line such that a total dispersion or total nonlinear effect in a portion of the transmission line upstream of this point is equal to that in a portion of the transmission line downstream of this point, and various parameters are set in each minute section of the upstream and downstream portions.

By using a third-order nonlinear optical medium such as an optical fiber and a semiconductor optical amplifier, phase conjugate light can be generated by nondegenerate four-wave mixing. When signal light having an angular frequency $\omega_S$ and pump light having an angular frequency $\omega_P$ ($\omega_P \neq \omega_S$) are supplied to the nonlinear optical medium, phase conjugate light (converted signal light) having an angular frequency $2\omega_P - \omega_S$ is generated by four-wave mixing based on the signal light and the pump light in the nonlinear optical medium, and this phase conjugate light is output together with the signal light and the pump light from the nonlinear optical medium.

The above term of "nondegenerate" used herein means that the wavelength of the signal light and the wavelength of the pump light are different from each other. Since the wavelength of the signal light, the wavelength of the pump light, and the wavelength (angular frequency) of the phase conjugate light satisfy the above-mentioned relation, wavelength conversion is performed simultaneously with the generation of the phase conjugate light.

The efficiency of conversion from the signal light to the phase conjugate light depends on the consistency of the polarization planes of the signal light and the pump light. However, since a general optical fiber transmission line has no capability of maintaining a polarization plane, the polarization state of the signal light to be converted varies with time. Accordingly, it is required that a device for phase conjugate conversion and wavelength conversion has no polarization dependence. The wording of "no polarization dependence" used herein means that the conversion efficiency is substantially constant irrespective of the polarization state of the signal light to be converted.

In the case that the device for phase conjugate conversion and wavelength conversion is applied to WDM (wavelength division multiplexing), a sufficiently broad conversion band is required to increase the number of channels that can be subjected to simultaneous conversion. The conversion band is defined as a maximum detuning wavelength (or detuning frequency) between pump light and signal light under the condition that phase conjugate light having a certain power can be obtained.

SUMMARY OF THE INVENTION

It is therefore an object of the present invention to provide a device for phase conjugate conversion and wavelength conversion, having no polarization dependence, and a system including the device.

It is another object of the present invention to provide a device for phase conjugate conversion and wavelength conversion, having a broad conversion band, and a system including the device.

In accordance with an aspect of the present invention, there is provided a device comprising an optical circulator, a polarization beam splitter, and a polarization maintaining fiber. The optical circulator has first, second, and third ports. The first port is supplied with signal light including first and second polarization components respectively having first and second polarization planes orthogonal to each other, and with pump light. The polarization beam splitter has fourth, fifth, and sixth ports. The fourth port is optically connected to the second port. The fourth and fifth ports are coupled by the first polarization plane, and the fourth and sixth ports are coupled by the second polarization plane. The polarization maintaining fiber has first and second ends, and has a polarization mode to be maintained between the first and second ends. The first end is optically connected to the fifth port so that the first polarization plane is adapted to the polarization mode, and the second end is optically connected to the sixth port so that the second polarization plane is adapted to the polarization mode.

The polarization maintaining fiber has first and second principal axes orthogonal to each other, for example. In this case, the polarization mode corresponds to one of the first and second principal axes. The present inventor has found that the zero-dispersion wavelength in the mode corresponding to the first principal axis is different from the zero-dispersion wavelength in the mode corresponding to the second principal axis.

The polarization maintaining fiber has a substantially constant zero-dispersion wavelength in relation to the polarization mode, for example. In this case, the pump light has a wavelength substantially equal to the zero-dispersion wavelength.

Broadening the conversion band of this device depends on the consistency between the wavelength of the pump light and the zero-dispersion wavelength of the polarization maintaining fiber.

In this device, the first polarization component of the signal light propagates in the polarization maintaining fiber from the first end to the second end, whereas the second polarization component of the signal light propagates in the polarization maintaining fiber from the second end to the first end. Furthermore, each of the first and second polarization components is adapted to the polarization mode of the polarization maintaining fiber. Accordingly, the consistency between the pump light wavelength and the zero-dispersion wavelength can be obtained with high accuracy, thereby broadening the conversion band in the conversion from the signal light to the converted signal light (phase conjugate light).

Further, so-called polarization diversity is carried out in relation to the conversion from the signal light to the converted signal light both in the direction where the first polarization component of the signal light and a part of the pump light propagate in the polarization maintaining fiber from the first end to the second end and in the direction where the second polarization component of the signal light and a part of the remaining pump light propagate in the polarization maintaining fiber from the second end to the first end. Accordingly, the efficiency of conversion from the signal light to the converted signal light is hardly dependent on the polarization state of the signal light supplied.

The device according to the present invention may be provided by the combination of the polarization beam splitter and the polarization maintaining fiber without the optical circulator.

In accordance with another aspect of the present invention, there is provided another device for phase conjugate conversion and wavelength conversion. This device comprises first and second optical circulators, a polarization beam splitter, and a polarization maintaining fiber. The first optical circulator has first, second, and third ports. The first port is supplied with first signal light including first and second polarization components respectively having first and second polarization planes orthogonal to each other, and with first pump light. The second optical circulator has fourth, fifth, and sixth ports. The fourth port is supplied with second signal light including third and fourth polarization components respectively having third and fourth polarization planes orthogonal to each other, and with second pump light. The polarization beam splitter has seventh, eighth, ninth, and tenth ports. The seventh port is optically connected to the second port, and the tenth port is optically connected to the fifth port. The seventh and eighth ports are coupled by the first polarization plane. The seventh and ninth ports are coupled by the second polarization plane. The ninth and tenth ports are coupled by the third polarization plane. The eighth and tenth ports are coupled by the fourth polarization plane. The polarization maintaining fiber has first and second ends, and has first and second polarization modes to be maintained between the first and second ends. The first end is optically connected to the seventh port so that the first and fourth polarization planes are respectively adapted to the first and second polarization modes. The second end is optically connected to the eighth port so that the second and third polarization planes are respectively adapted to the first and second polarization modes.

With this configuration, the two optical circulators are used in consideration of the symmetry in the polarization beam splitter and the polarization maintaining fiber. Accordingly, bidirectionality in the conversion from the signal light to the converted signal light can be ensured.

In accordance with a further aspect of the present invention, there is provided a system comprising first and second optical fiber networks each adapted to wavelength division multiplexing, and a converter connected between the first and second optical fiber networks. The converter is provided by the device according to the first or second aspect of the present invention mentioned above. The converter may include a pumping source for outputting pump light.

The conversion band in the conversion from the signal light to the converted signal light in the converter is broadened according to the present invention. Accordingly, by combining the present invention with wavelength division multiplexing, a flexible system can be constructed.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
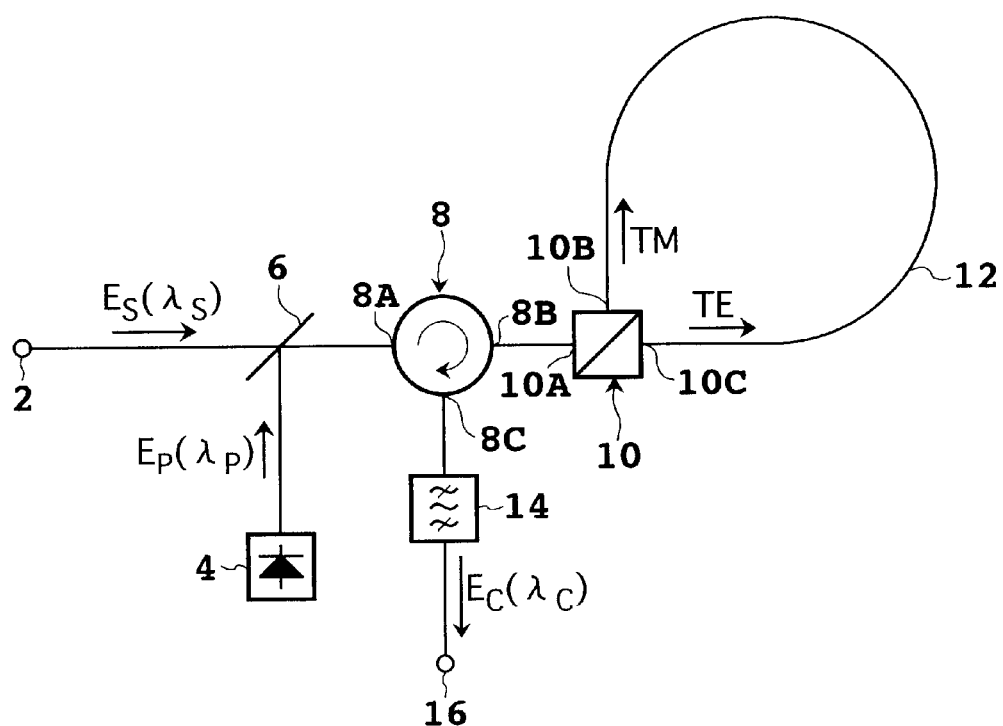
FIG. 1 is a diagram showing a first preferred embodiment of the device according to the present invention.

Some preferred embodiments of the present invention will now be described in detail with reference to the attached drawings.

Let us consider the case where an optical pulse propagates in a dispersive medium. In the case that the dispersive medium is a normal dispersive medium ($\partial^2\beta/\partial\omega^2>0$), the frequency of an unchirped pulse propagating in the dispersive medium is shifted to lower frequencies near the leading edge of the pulse, and is shifted to higher frequencies near the trailing edge of the pulse. In the case that the dispersive medium is an anomalous dispersive medium ($\partial^2\beta/\partial\omega^2<0$), the frequency of an unchirped pulse is shifted to higher frequencies near the leading edge of the pulse, and is shifted to lower frequencies near the trailing edge of the pulse. In the above expressions, $\beta$ and $\omega$ denote the propagation constant and the angular frequency of light, respectively. In the normal dispersive medium, the longer the wavelength of the pulse, the higher the group velocity, whereas in the anomalous dispersive medium, the shorter the wavelength of the pulse, the higher the group velocity, so that in any case the pulse width is broadened.

On the other hand, the refractive index of the dispersive medium is changed by the optical Kerr effect in the case that the intensity of light is large, by the following amount.

$$\Delta n(t) = n_2 |E(t)|^2$$

where $n_2$ is the nonlinear refractive index. For a normal silica fiber, this value is about $3.2 \times 10^{-20}$ m$^2$/W. When an optical pulse undergoes the optical Kerr effect in a nonlinear medium, the spectrum of the optical pulse is broadened (chirped) by the following amount.

$$\Delta\omega(t) = -\partial\Delta\phi(t)/\partial t$$
$$= -(2\pi n_2/\lambda)(\partial|E(t)|^2/\partial t)\Delta z$$

where $\Delta z$ is the interaction length.

This phenomenon is generally referred to as self-phase modulation (SPM). The SPM causes frequency shift of an optical pulse to lower frequencies near the leading edge of the pulse and frequency shift of the pulse to higher frequencies near the trailing edge of the pulse. Such chirping due to the SPM makes the influence of dispersion more remarkable, and as a result the distortion of the pulse becomes more remarkable. Accordingly, when an optical pulse undergoes the optical Kerr effect in a normal dispersive medium, spectral broadening of the pulse is greater than in the case of chromatic dispersion only, whereas when an optical pulse undergoes the optical Kerr effect in an anomalous dispersive medium, pulse compression occurs.

Thus, in consideration of the effect of chromatic dispersion as mentioned above, large pulse broadening occurs in the case of a normal dispersive medium, whereas a larger one of the effects of pulse broadening due to chromatic dispersion and pulse compression due to SPM appears in the case of an anomalous dispersive medium. Balancing these two effects is achieved by optical soliton.

It is generally prone to be considered that a higher signal-to-noise ratio (SNR) can be conveniently maintained by applying pulse compression due to SPM in an anomalous dispersive medium. However, it can be said that the application of pulse compression is not always preferable, because transmission with high-level optical power has recently been allowed by using an optical amplifier, and a relatively small chromatic dispersion has recently been implementable by the development of a dispersion shifted fiber.

In other words, the effect of pulse compression may become excessive to cause large waveform distortion. Particularly in the case of NRZ pulse, pulse compression occurs concentrically near the leading edge and the trailing edge of the pulse, causing a rapid waveform change. In an extreme case, the trailing edge may precede the leading edge to cause splitting of the pulse into three portions. Further, in the case of optical amplifier repeated long-haul transmission, there is a problem such that four-wave mixing occurs between signal light and amplified spontaneous emission in an optical amplifier generated by the signal light as pump light, causing a remarkable reduction in SNR (modulation instability).

The distortion of an optical pulse due to chromatic dispersion and nonlinearity as mentioned above can be compensated by applying phase conjugate optics. For example, a signal light beam transmitted by a first optical fiber transmission line is converted into a phase conjugate light beam by a phase conjugator, and the phase conjugate light beam is transmitted by a second optical fiber transmission line. By properly setting parameters related to chromatic dispersion and nonlinearity in the first and second optical fiber transmission lines, a substantially distortionless optical pulse can be obtained at an output end of the second optical fiber transmission line.

However, the efficiency of conversion from the signal light beam to the phase conjugate light beam in the phase conjugator is generally dependent on the polarization state of the signal light beam, so that a phase conjugator having a polarization-independent conversion efficiency is desired.

Such a phase conjugator having a polarization-independent conversion efficiency can be configured by applying a polarization scrambling method, polarization diversity method, or polarization active control method. Further, also by using a polarization maintaining fiber (PMF) as an optical fiber transmission line, the polarization dependence of the conversion efficiency in the phase conjugator can be eliminated. In the present invention, the polarization diversity method is adopted to eliminate the polarization dependence of the conversion efficiency.

FIG. 1 is a diagram showing a first preferred embodiment of the device according to the present invention. The device shown in FIG. 1 includes an input port 2, pumping source 4, optical coupler 6, optical circulator 8, polarization beam splitter 10, polarization maintaining fiber (PMF) 12, optical band-pass filter 14, and output port 16. The configuration and operation of this device will be hereinafter described in detail.

Figure 2:
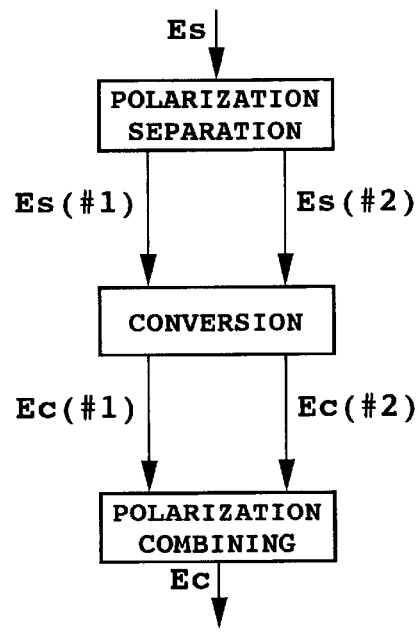
FIG. 2 is a block diagram for illustrating the operation principle of the device according to the present invention.

FIG. 2 is a block diagram for illustrating the operation principle of the device according to the present invention. In the first process of polarization separation, signal light $E_S$ is separated into two polarization components $E_S(\#1)$ and $E_S(\#2)$. The polarization components $E_S(\#1)$ and $E_S(\#2)$ have polarization planes orthogonal to each other. In the next process of conversion, the polarization components $E_S(\#1)$ and $E_S(\#2)$ are converted into phase conjugate lights $E_C(\#1)$ and $E_C(\#2)$, respectively. The polarization planes of the phase conjugate lights $E_C(\#1)$ and $E_C(\#2)$ coincide with the polarization planes of the polarization components $E_S(\#1)$ and $E_S(\#2)$, respectively. In the last process of polarization combining, the phase conjugate lights $E_C(\#1)$ and $E_C(\#2)$ are combined to obtain phase conjugate light (converted signal light) $E_C$.

In the device shown in FIG. 1, the above processes of polarization separation and polarization combining are carried out in the polarization beam splitter 10, and the above process of conversion is carried out in the PMF 12 as a nonlinear optical medium.

Figure 3:
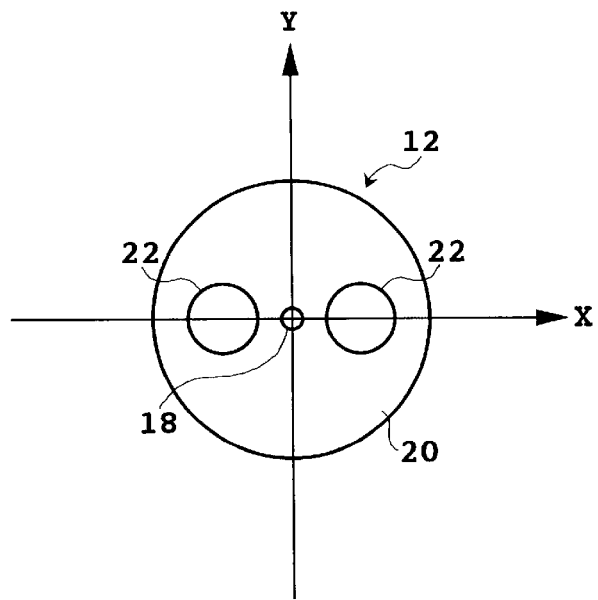
FIG. 3 is a diagram for illustrating the polarization mode of a PMF (polarization maintaining fiber)

FIG. 3 is a diagram for illustrating the polarization mode of the PMF 12. The PMF 12 is composed of a core 18 having a relatively high refractive index, a cladding 20 having a relatively low refractive index, for covering the core 18, and a pair of stress regions 22 provided in the cladding 20 on the opposite sides of the core 18. In the cross section of the PMF 12, the line passing through the centers of the core 18 and the stress regions 22 is defined as an X axis, and the line passing through the center of the core 18 and orthogonal to the X axis is defined as a Y axis. Each of the X axis and the Y axis is referred to as a principal axis. The propagation constant of a polarization component having a polarization plane parallel to the X axis is largely different from the propagation constant of a polarization component having a polarization plane parallel to the Y axis, so that each polarization component can maintain its polarization state during propagation in the PMF 12.

According to the measurement by the present inventor, it has been found that the zero-dispersion wavelength for the polarization component having the polarization plane parallel to the X axis is different from the zero-dispersion wavelength for the polarization component having the polarization plane parallel to the Y axis.

Accordingly, in the case of performing polarization diversity for one channel by using the two principal axes (the X axis and the Y axis) of the PMF 12, the conversion band cannot be broadened because of the difference in zero-dispersion wavelength.

In the present invention, one of the two principal axes is used as the polarization mode to perform polarization diversity, so that the conversion band can be broadened. This will now be described more specifically.

Referring to FIG. 1, signal light $E_S$ (wavelength $\lambda_S$) to be converted is supplied to the input port 2. The pumping source 4 outputs pump light $E_P$ (wavelength $\lambda_P$). The pumping source 4 may be provided by a laser diode, for example. In this case, the pump light $E_P$ is a substantially linearly polarized wave, and its polarization plane is set as will be hereinafter described. The polarization state of the signal light $E_S$ is arbitrary.

The signal light $E_S$ and the pump light $E_P$ are multiplexed or combined by the optical coupler 6, and supplied to a port 8A of the optical circulator 8. The optical circulator 8 functions so as to output light supplied to the port 8A from a port 8B, output light supplied to the port 8B from a port 8C, and output light supplied to the port 8C from the port 8A. The last function is not used in this preferred embodiment.

The polarization beam splitter 10 has ports 10A, 10B, and 10C. The port 10A is optically connected to the port 8B of the optical circulator 8. The ports 10A and 10B are coupled by a TM component (first polarization component) having a first polarization plane perpendicular to the sheet plane of FIG. 1, and the ports 10A and 10C are coupled by a TE component (second polarization component) having a second polarization plane parallel to the sheet plane of FIG. 1.

The opposite ends of the PMF 12 are optically connected to the ports 10B and 10C of the polarization beam splitter 10. For the convenience of description, the polarization mode to be maintained by the PMF 12 is given by the Y axis shown in FIG. 3. At the port 10B, the first polarization plane perpendicular to the sheet plane of FIG. 1 is adapted to the polarization mode of the PMF 12, and at the port 10C, the second polarization plane parallel to the sheet plane of FIG. 1 is adapted to the polarization mode of the PMF 12. In other words, the Y axis of the PMF 12 is perpendicular to the sheet plane of FIG. 1 at the port 10B, and parallel to the sheet plane of FIG. 1 at the port 10C. That is, the PMF 12 is spatially twisted 90° between the ports 10B and 10C.

The signal light and the pump light both supplied to the port 8A of the optical circulator 8 are output from the port 8B. The output light from the port 8B is separated into a TM component and a TE component by the polarization beam splitter 10. The TM component propagates in the PMF 12 from the port 10B to the port 10C, and the TE component propagates in the PMF 12 from the port 10C to the port 10B. The TM component initially has a polarization plane perpendicular to the sheet plane of FIG. 1 at the time of output from the port 10B. During propagation in the PMF 12, the polarization plane of the TM component is rotated 90° to become parallel to the sheet plane of FIG. 1 at the port 10C. Accordingly, the TM component having propagated in the PMF 12 clockwise as viewed in FIG. 1 is transmitted from the port 10C to the port 10A. On the other hand, the TE component initially has a polarization plane parallel to the sheet plane of FIG. 1 at the time of output from the port 10C. During propagation in the PMF 12, the polarization plane of the TE component is rotated 90° to become perpendicular to the sheet plane of FIG. 1 at the port 10B. Accordingly, the TE component having propagated in the PMF 12 counterclockwise as viewed in FIG. 1 is transmitted from the port 10B to the port 10A.

Thus, the TM component and the TE component are combined in the polarization beam splitter 10, and output from the port 10A. The output light from the port 10A is supplied to the port 8B of the optical circulator 8, and output from the port 8C. The output light from the port 8C is passed through the optical band-pass filter 14, and output from the output port 16.

The output light from the port 10A of the polarization beam splitter 10 as the result of combination of the TM and TE components include not only the signal light and the pump light, but also phase conjugate light (converted signal light) $E_C$ (wavelength $\lambda_C$) newly generated in the PMF 12. That is, a part of the signal light is converted into phase conjugate light by the four-wave mixing based on the signal light and the pump light in the PMF 12. The wavelengths $\lambda_S$, $\lambda_P$, and $\lambda_C$ satisfy the above-mentioned relation, and they are therefore different from each other. Accordingly, the phase conjugate light is extracted by the optical band-pass filter 14. That is, the optical band-pass filter 14 has a passband including the wavelength $\lambda_C$ and excluding the wavelengths $\lambda_S$ and $\lambda_P$.

As mentioned above, the polarization mode corresponding to one (the Y axis) of the principal axes of the PMF 12 is used, so that the wavelength of the pump light can be made accurately coincident with the zero-dispersion wavelength related to the Y axis of the PMF 12, thereby broadening the conversion band. As compared with the prior art wherein the conversion bandwidth is about 40 nm at most, the present invention can broaden the conversion bandwidth up to about 100 nm.

In the case that a laser diode is used as the pumping source 4, the pump light is given as a substantially linearly polarized wave. In this case, the polarization plane of the pump light is set so that the efficiency of conversion from the signal light to the phase conjugate light is not dependent on the polarization state of the signal light. More specifically, the polarization plane of the pump light may be set so as to be inclined 45° with respect to the sheet plane of FIG. 1 at the port 10A of the polarization beam splitter 10, in order that the ratio of distribution of the pump light to the TM component and the TE component becomes 1:1.

Thus, the device according to the present invention adopts polarization diversity, thereby enabling the provision of a polarization-independent converter.

Figure 4:
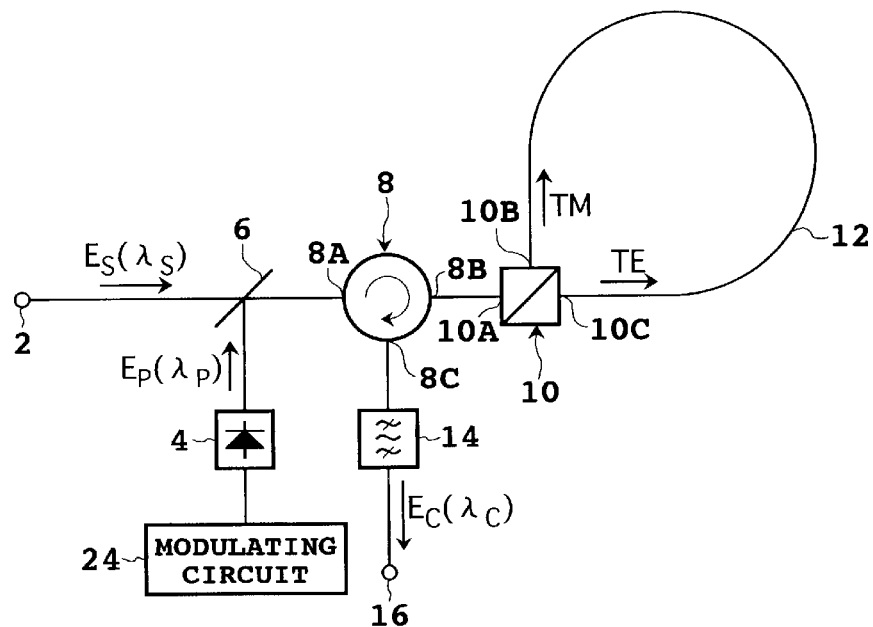
FIG. 4 is a diagram showing a second preferred embodiment of the device according to the present invention.

FIG. 4 is a diagram showing a second preferred embodiment of the device according to the present invention. In this preferred embodiment, a modulating circuit 24 is connected to the pumping source 4, so as to modulate or dither the phase or frequency of the pump light to be output from the pumping source 4. To improve the efficiency of occurrence of four-wave mixing in the PMF 12, increasing the power of the pump light is effective. However, if the power of the pump light is excessively increased, the pump light is undesirably reflected inside the PMF 12 because of stimulated Brillouin scattering (SBS). In this preferred embodiment, the occurrence of SBS can be suppressed by modulating or dithering the phase or frequency of the pump light, thereby enabling the provision of a converter having a high conversion efficiency. The modulation frequency may be set to hundreds of KHz (e.g., 150 KHz). While direct modulation is applied to the pumping source 4 provided by an LD, for example, in this preferred embodiment, indirect modulation using an external modulator may be applied.

Figure 5:
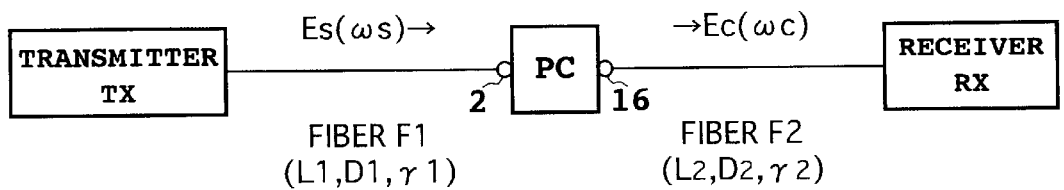
FIG. 5 is a block diagram showing a first preferred embodiment of the system according to the present invention.

FIG. 5 is a block diagram showing a first preferred embodiment of the system according to the present invention. This preferred embodiment is intended to compensate for waveform distortion due to chromatic dispersion and nonlinear optical Kerr effect in an optical fiber transmission line. To this end, the device shown in FIG. 1 or 4 may be used as a converter (or phase conjugator) PC at the substantially midpoint of the optical fiber transmission line. However, the phase conjugator is not limited by the device shown in FIG. 1 or 4. The phase conjugator PC is composed of a nonlinear optical medium, a pumping light source, and an optical means for supplying signal light to the nonlinear optical medium along with a pump light generated by the pumping light source. The nonlinear optical medium provides a second-order (three wave mixing) or third-order (four wave mixing) nonlinear optical effect. In the case of the third-order optical effect, a phase conjugate light is generated by a degenerate or non-degenerate four wave mixing in the nonlinear optical medium. Available for a particular nonlinear optical medium is an optical semiconductor such as a semiconductor amplifier of traveling wave type, an organic medium, an optical waveguide using LiNbO$_3$ or the like, or a single-mode fiber. Especially, when using a single-mode fiber, a zero-dispersion wavelength of the single-mode fiber and a wavelength of the pump light are matched to increase a phase conjugate light generating efficiency. U.S. Pat. No. 5,920,588 discloses a phase conjugator having a DFB (distributed feed-back) laser as the nonlinear optical medium.

Signal light $E_S$ output from a transmitter (TX) is transmitted by a first optical fiber F1 (length $L_1$, dispersion $D_1$, nonlinear coefficient $\gamma_1$), and thereafter input into a phase conjugator (PC). The signal light $E_S$ is converted into phase conjugate light $E_C$ in the phase conjugator, and the phase conjugate light $E_C$ is then transmitted to a receiver (RX) by a second optical fiber F2 (length $L_2$, dispersion $D_2$, nonlinear coefficient $\gamma_2$). The receiver has a photodetector for receiving the phase conjugate light $E_C$ to detect the signal. As a modulation method for the signal to be transmitted, various methods such as optical amplitude (intensity) modulation, frequency modulation, and phase modulation may be applied. The detection of the received signal may be performed by optical direct detection, optical heterodyne detection, etc. after extracting the phase conjugate light through a band-pass filter.

The optical fiber used in this preferred embodiment is a single-mode silica fiber (SMF) in many cases. Typical examples of the single-mode silica fiber are a 1.3-μm zero-dispersion optical fiber and a 1.55-μm dispersion shifted fiber (DSF).

The signal light may be wavelength division multiplexed (WDM) signal light obtained by wavelength division multiplexing a plurality of optical signals having different wavelengths. In this case, by arranging the wavelengths of the plural optical signals at unequal intervals along a wavelength axis, undesirable occurrence of FWM in the optical fiber transmission line can be suppressed to thereby prevent crosstalk (this applies similarly to the description with reference to FIG. 10 to follow).

The compensation for waveform distortion due to chromatic dispersion and self-phase modulation in the optical fiber transmission line of the system shown in FIG. 5 can be effected by making equal the magnitudes of dispersion and nonlinear effect in two corresponding portions of the first and second optical fibers F1 and F2 with respect to the phase conjugator PC. These corresponding portions are defined as two portions where the accumulated values of dispersion or optical Kerr effect measured from the PC are equal to each other. That is, when the optical fiber transmission line is virtually divided into a plurality of sections, the magnitudes of dispersion and nonlinear effect in any symmetrical ones of the sections with respect to the PC are to be made equal to each other. This means that the dispersions in the symmetrical sections are to be made equal to each other and that the following equation is to hold between the symmetrical sections.

$$D_1/\gamma_1 P_1 = D_2/\gamma_2 P_2 \tag{1a}$$

where $P_1$ and $P_2$ are the optical powers in the symmetrical sections, and $\gamma_1$ and $\gamma_2$ are the nonlinear coefficients of optical Kerr effect in the optical fibers F1 and F2, respectively. The nonlinear coefficient $\gamma_j$ (j=1, 2) is expressed as follows:

$$\gamma_j = \omega n_{2j}/cA_{\mathit{eff}\mathit{j}} \tag{2a}$$

where ω is the optical angular frequency, c is the velocity of light in the vacuum, and $n_{2j}$ and $A_{\mathit{eff}\mathit{j}}$ are the nonlinear refractive index and the effective core area of the optical fiber Fj (j=1, 2), respectively.

The compensation for a decrease in nonlinear effect due to loss along the transmission line can be effected by reducing dispersion or by increasing optical Kerr effect. Changing the dispersion can be made by design of an optical fiber, and this method is promising. For example, this method is now widely carried out by changing the zero-dispersion wavelength of a dispersion shifted fiber (DSF) or by changing the relative index difference between the core and the cladding of an optical fiber or changing the core diameter. On the other hand, changing the optical Kerr effect can be made by changing the nonlinear refractive index or by changing the optical intensity.

The transmission line of the system may be composed of a dispersion-decreasing DCF (DD-DCF) having such a structure that the dispersion of a dispersion compensating fiber (DCF) is decreased in its longitudinal direction in proportion to a change in optical Kerr effect, and a normal dispersive DSF, thereby allowing high-speed, long-haul transmission.

It is known that in long-haul transmission using an optical amplifier, the use of a normal dispersive fiber is effective in reducing nonlinear distortion (modulation instability) due to noise light in the optical amplifier. Accordingly, the above configuration using a normal dispersive DSF is promising.

In the case that the change in optical Kerr effect is not so large (e.g., in the case that the repeater spacing of optical amplifiers is sufficiently shorter than the nonlinear length), the following approximation by average power holds in contrast with the above-mentioned exact compensation method.

$$D_1' L_1 = D_2' L_2 \tag{3a}$$

$$\gamma_1 P_1' L_1 = \gamma_2 P_2' L_2 \tag{4a}$$

where $P_1'$ and $P_2'$ are the average powers in the optical fibers F1 and F2, respectively, and $D_1'$ and $D_2'$ are the average dispersions of the optical fibers F1 and F2, respectively.

Additionally, although not satisfying the ideal waveform compensation condition given by Eq. (1a), dispersion compensators may be suitably located along the transmission line by location of dispersions having opposite signs.

This method is effective especially in long-haul transmission such as submarine transmission. The reason is as follows:

In the compensation using a PC, the waveform distortions in optical fibers placed on the upstream and downstream sides of the PC may be equalized. The waveform is most distorted on the opposite sides of the PC. Accordingly, the spectrum of an optical pulse is most broadened at the position of the PC. On the other hand, noises are added from the PC and optical amplifiers in the transmission line, and the broader the spectrum of the optical pulse, the greater the SNR reduction due to these noises. Accordingly, designing the system so as to suppress the spectral broadening on the opposite sides of the PC is greatly effective in extending a transmission distance.

In this sense, decreasing a total dispersion of a transmission line by dispersion compensation applied to the transmission line is effective.

The nonlinear coefficient γ of a usual DSF (dispersion shifted fiber) is as small as about 2.6 W$^{-1}$ km$^{-1}$. Therefore, to obtain a sufficient conversion efficiency in the case of using such a usual DSF as a nonlinear optical medium for generating phase conjugate light, the fiber is required to have a length of 10 km or more. It is accordingly desired to provide a DSF having a large nonlinear coefficient enough to reduce the fiber length. If the length of a DSF used as a nonlinear optical medium for generating phase conjugate light can be reduced, the zero-dispersion wavelength of the DSF can be managed with high accuracy, thereby facilitating exact matching of the wavelength of pump light to the zero-dispersion wavelength of the DSF. As a result, a broad conversion band can be obtained. The conversion band is defined herein as a maximum detuning wavelength (detuning frequency) between pump light and signal light under the condition that phase conjugate light having a certain power is obtained.

In increasing the nonlinear coefficient $\gamma$, increasing the nonlinear refractive index $n_2$ or decreasing a mode field diameter (MFD) corresponding to the effective core area $A_{\mathit{eff}}$ is effective. Increasing the nonlinear refractive index $n_2$ can be effected by doping the cladding with fluorine or the like or by doping the core with a high concentration of $GeO_2$, for example. By doping the core with 25–30 mol % of $GeO_2$, a large value of $5 \times 10^{-20}$ $m^2/W$ or more is obtained as the nonlinear refractive index $n_2$ (in comparison, about $3.2 \times 10^{-20}$ $m^2/W$ for a normal silica fiber). Decreasing the MFD can be effected by suitably setting a relative index difference $\Delta$ or by suitably designing the core shape. Such a DSF can be designed similarly to a DCF (dispersion compensating fiber). For example, by doping the core with 25–30 mol % of $GeO_2$ and setting the relative index difference $\Delta$ to 2.5–3.0%, a small value of less than 4 µm is obtained as the MFD. As the total effect, a large value of 15 $W^{-1}km^{-1}$ or more is obtained as the nonlinear coefficient $\gamma$.

Another important factor to be considered is that the DSF providing such a large value as the nonlinear coefficient $\gamma$ must have a zero-dispersion wavelength included in a pump band. Such consistency between the zero-dispersion wavelength and the pump band can be attained by setting the fiber parameters (e.g., relative index difference $\Delta$ and MFD) in the following manner. When the relative index difference $\Delta$ in a normal optical fiber is increased with the MFD fixed, the dispersion is increased in a normal dispersive region. The above-mentioned DD-DCF used for pre-compensation or post-compensation by a phase conjugator is realized on such a principle. On the other hand, the larger the core diameter, the smaller the dispersion, while the smaller the core diameter, the larger the dispersion. Accordingly, zero dispersion for pump light can be obtained by first setting the MFD to a certain value adapted to the pump band and thereafter adjusting the core diameter so that the zero-dispersion wavelength coincides with a predetermined wavelength of the pump light.

A conversion efficiency $\eta_C$ in an optical fiber having a length L and a loss $\alpha$ can be approximated by the following equation.

$$\eta_C = \exp(-\alpha L)(\gamma P_P L)^2 \quad (5a)$$

where $P_P$ is the average pump light power. Accordingly, as compared with a normal DSF having a nonlinear coefficient $\gamma$ of 2.6 $W^{-1}km^{-1}$, a fiber having a nonlinear coefficient $\gamma$ of 15 $W^{-1}km^{-1}$ can achieve the same conversion efficiency with a length smaller by $2.6/15 \approx 1/5.7$. In such a normal DSF, a fiber length of about 10 km is required as mentioned above to obtain a sufficiently large conversion efficiency. To the contrary, in such a fiber having a large nonlinear coefficient $\gamma$ as mentioned above, a similar conversion efficiency can be obtained with a smaller length of about 1–2 km. In actual, the loss is also reduced by an amount corresponding to the reduction in the fiber length, so that the fiber length can be further reduced to obtain the same conversion efficiency. In such a shorter DSF, the controllability of the zero-dispersion wavelength is improved and therefore the wavelength of the pump light can be made to exactly coincide with the zero-dispersion wavelength, thus obtaining a broad conversion band. Furthermore, when the fiber length is several kilometers, a polarization plane preserving ability is ensured, so that the use of such a shorter DSF is greatly effective in achieving a high conversion efficiency and a broad conversion band and in eliminating polarization dependence.

In effectively generating four-wave mixing by using an optical fiber, it is important to match the phases of signal light, pump light, and phase conjugate light. A phase mismatch quantity $\Delta k$ can be approximated by the following equation.

$$\Delta k = \delta \omega^2 \beta_2(\omega_P) + 2\gamma P_P \quad (6a)$$

where $\beta_2(\omega_P)$ is the chromatic dispersion at a pump light frequency $\omega_P$, and $\delta \omega$ is the frequency difference between signal light and pump light. So far as pump light having a specially large power (e.g., 100 mW or more) is not used, the second term in Eq. (6a) is sufficiently smaller than the first term, and the former is negligible. Accordingly, phase matching (making $\Delta k$ approach nearly zero) can be obtained by making the wavelength of pump light coincide with the zero-dispersion wavelength of the fiber. However, since the zero-dispersion wavelength of an actual fiber varies along the fiber length, it is not easy to maintain the phase matching condition over the entire fiber length.

In a device having an optical fiber as a nonlinear optical medium for generating phase conjugate light, the conversion band for the phase conjugate light is limited by the dispersion of the optical fiber. Accordingly, if the dispersion of the optical fiber along its length is completely controlled, e.g., if an optical fiber having a unique zero-dispersion wavelength over the entire fiber length (exactly, the nonlinear length) is produced, a conversion band having a virtually infinite width (a width unlimited in some range where the dispersion slope is linear) can be obtained by matching the pump light wavelength to the unique zero-dispersion wavelength of the optical fiber. However, the zero-dispersion wavelength of an actual optical fiber varies along its length because of problems in a manufacturing technique for the optical fiber, with the result that the phase matching condition is deviated from the ideal condition, causing limitation of the conversion band.

However, by cutting an optical fiber into a plurality of small sections and then connecting, e.g., splicing the small sections in such an order that the adjacent ones of the small sections have similar zero-dispersion wavelengths (in an order different from the initial order counted from an end of the optical fiber), an optical fiber suitable for providing a phase conjugator having a broad conversion band can be obtained with the average of chromatic dispersions over the entire fiber length being unchanged.

Alternatively, a broad conversion band can be obtained by preparing a plurality of fibers each having a length (e.g., hundreds of meters or less) allowing dispersion management with a high accuracy so required as to obtain a sufficiently broad conversion band, then combining and splicing some of the fibers having required zero-dispersion wavelengths to obtain a fiber having a length required to obtain a required conversion efficiency, and providing a phase conjugator by use of this fiber.

In the case of broadening the conversion band as mentioned above, it is effective to gather the fiber portions having smaller zero-dispersion wavelengths or having smaller variations in zero-dispersion wavelength near a pump light input end of a nonlinear optical medium, because the power of pump light is higher near the pump light input end. Further, the conversion band can be further broadened by increasing the number of fiber sections as required and/or by alternately arranging the positive and negative signs of dispersion at a portion distant from the pump light input end and having relatively large dispersions.

In dividing an optical fiber into a plurality of sections as mentioned above, an index of determining whether or not the length of each section is sufficiently small may be based on the nonlinear length. As in the compensation for nonlinear effect, it can be considered that phase matching in FWM (four-wave mixing) in a fiber having a length sufficiently smaller than the nonlinear length is dependent on the average dispersion of the fiber. As an example, in FWM using a pump light power of about 30 mW in a fiber having a nonlinear coefficient $\gamma$ of 2.6 $W^{-1}km^{-1}$, the nonlinear length becomes about 12.8 km, so that the above-mentioned index is equal to about 1/10 of this length, i.e., about 1 km. As another example, in FWM using a pump light power of about 30 mW in a fiber having a nonlinear coefficient $\gamma$ of 15 $W^{-1}km^{-1}$, the nonlinear length becomes about 2.2 km, so that the above-mentioned index is equal to about 1/10 of this length, i.e., about 200 m. In any case, by measuring the average zero-dispersion wavelengths of fibers each having a length sufficiently smaller than the nonlinear length, and combining the fibers having substantially the same average zero-dispersion wavelength to provide a nonlinear optical medium having a required conversion efficiency, a phase conjugator having a broad conversion band can be obtained.

According to the present invention, there is provided a first method for manufacturing a device having a nonlinear optical medium for generating phase conjugate light. In this method, an optical fiber is first cut into a plurality of sections. Then, the plurality of sections are rearranged to be connected so that a conversion band in nondegenerate four-wave mixing using a nonlinear optical medium is maximized, thereby providing a nonlinear optical medium. By supplying pump light and signal light to this nonlinear optical medium, phase conjugate light is generated. Thus, the band of conversion from the signal light into the phase conjugate light is sufficiently broad. Accordingly, in the case that the signal light is WDM signal light obtained by wavelength division multiplexing a plurality of optical signals having different wavelengths, the plurality of optical signals can be converted simultaneously into the phase conjugate light (a plurality of phase conjugate optical signals).

Preferably, the dispersions of the plural sections (e.g., the dispersions to pump light) are measured, and the plural sections are rearranged so that the section having a smaller value of the dispersion is located near an input end of a nonlinear optical medium where pump light is input. With this configuration, the phase matching condition can be effectively obtained at a portion of the medium where the power of the pump light is high, thereby effectively broadening the conversion band.

Preferably, the plural sections are connected so that the positive and negative signs of dispersion of at least a part of the plural sections are alternately arranged. With this configuration, the average dispersion of each section can be suppressed to thereby effectively broaden the conversion band.

According to the present invention, there is provided a second method for manufacturing a device having a nonlinear optical medium for generating phase conjugate light. In this method, an optical fiber is first cut into a plurality of sections. Then, the dispersions of the plural sections (e.g., the dispersions to pump light) are measured. Thereafter, some of the plural sections having smaller dispersions enough to obtain a required conversion band by four-wave mixing using a nonlinear optical medium are selected to be connected, thereby obtaining a nonlinear optical medium. Also in the case of constructing a phase conjugator by using the nonlinear optical medium obtained by this second method, a broad conversion band can be obtained, thereby allowing simultaneous conversion of WDM signal light.

While the optical fiber is first cut into a plurality of sections in each of the first and second methods according to the present invention, the present invention is not limited to these methods. For example, the optical fiber may be cut as required in the following manner.

According to the present invention, there is provided a third method for manufacturing a device having a nonlinear optical medium for generating phase conjugate light. In this method, a deviation in zero-dispersion wavelength of an optical fiber is first measured. Then, the optical fiber is cut into sections in the case that the measured deviation is greater than a predetermined range. In this case, a deviation in zero-dispersion wavelength of each cut fiber section is converged to fall within the predetermined range. Thereafter, the optical fibers or cut fiber sections each having a zero-dispersion wavelength substantially equal to the wavelength of pump light are selected to be connected, thereby obtaining a nonlinear optical medium.

The measurement of the deviation in zero-dispersion wavelength may be made by using the fact that the efficiency of occurrence of four-wave mixing differs according to zero-dispersion wavelength, for example. In general, a chromatic dispersion can be obtained by measuring a wavelength dependence of group velocity. As mentioned above, the best phase matching condition in four-wave mixing is obtained when a pump light wavelength and a zero-dispersion wavelength coincide with each other. Accordingly, the zero-dispersion wavelength can be obtained as a pump light wavelength giving a maximum efficiency of occurrence of four-wave mixing (generation of phase conjugate light) as measured in the condition where the wavelength difference between pump light and signal light is set to a relatively large fixed value, e.g., about 10–20 nm. Further, the efficiency of occurrence of four-wave mixing is proportional to the square of the intensity of pump light. Accordingly, in the case that the zero-dispersion wavelength varies in the longitudinal direction of an optical fiber, different values of the zero-dispersion wavelength are generally measured in the case that signal light and pump light are input from one end face of the optical fiber and in the case that they are input from the other end face of the optical fiber. Accordingly, the deviation in zero-dispersion wavelength of the optical fiber can be obtained according to the above two measured values of the zero-dispersion wavelength. This method will now be described more specifically.

Figure 6:
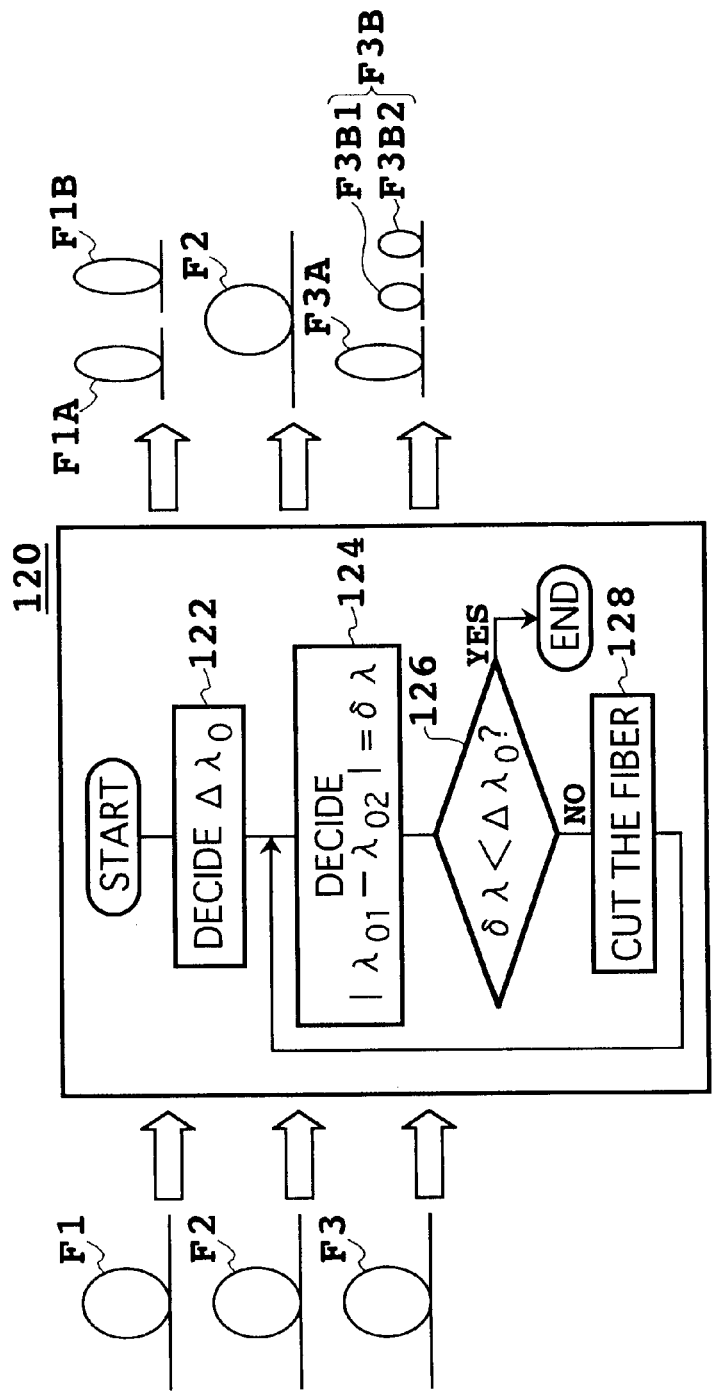
FIG. 6 is a diagram showing an example of a manufacturing process for a nonlinear optical medium.

Referring to FIG. 6, there is shown a manufacturing process 120 for a nonlinear optical medium having a small deviation in zero-dispersion wavelength. In step 122, a tolerance $\Delta\lambda_0$ may be determined as a system demanded characteristic from a required conversion band. Specifically, the tolerance $\Delta\lambda_0$ is 2 nm, for example. In step 124, a deviation $\delta\lambda$ in zero-dispersion wavelength is measured. For example, when an optical fiber F1 is given, a zero-dispersion wavelength $\lambda_{01}$ obtained in the case that signal light and pump light are input into the optical fiber F1 from its first end and a zero-dispersion wavelength $\lambda_{02}$ obtained in the case that signal light and pump light are input into the optical fiber F1 from its second end are measured from the efficiency of occurrence of four-wave mixing mentioned above. In this case, the value of $|\lambda_{01}-\lambda_{02}|$ can be used as a substitution for the deviation $\delta\lambda$ in zero-dispersion wavelength.

In step 126, it is determined whether or not the deviation $\delta\lambda$ is smaller than the tolerance $\Delta\lambda_0$. It is assumed that $\delta\lambda \geq \Delta\lambda_0$, the program proceeds to step 128. In step 128, the optical fiber F1 is cut into two optical fibers F1A and F1B. Then, the program returns to step 124, and a deviation $\delta\lambda$ in each of the optical fibers F1A and F1B is measured. Then, the decision of step 126 is made on each measured deviation $\delta\lambda$. It is assumed that each measured deviation $\delta\lambda$ is smaller than $\Delta\lambda_0$, this flow is ended. In the fiber cutting step 128, a point of cutting of the optical fiber F1 is arbitrary. That is, the lengths of the optical fibers F1A and F1B may be equal to each other or different from each other.

While the steps 124 and 126 are repeated once in the above flow, they may not be repeated or may be repeated twice or more. For example, in the case that an optical fiber F2 having a small deviation in zero-dispersion wavelength is given, the condition is satisfied by the decision of step 126 in the first cycle of the flow. In this case, the optical fiber F2 is not cut. In contrast, when an optical fiber F3 having a zero-dispersion wavelength largely varying in the longitudinal direction, the optical fiber F3 is cut into two optical fibers F3A and F3B in the step 128 in the first cycle of the flow. In the case that the optical fiber F3A satisfies the condition and the optical fiber F3B does not satisfy the condition in the step 126 in the second cycle of the flow, the optical fiber F3B is cut into two optical fibers F3B1 and F3B2 in the step 128 in the second cycle of the flow. Thereafter, this flow may be ended. In this case, the original optical fiber F3 is finally divided into the three optical fibers F3A, F3B1, and F3B2, and the deviation $\delta\lambda$ in zero-dispersion wavelength of each optical fiber becomes smaller than the tolerance $\Delta\lambda_0$.

These plural optical fiber sections (the optical fibers F1A, F1B, . . . ) thus obtained are subjected to arrangement based on the measured zero-dispersion wavelengths of these sections. Then, of all the fiber sections, any sections each having a zero-dispersion wavelength substantially equal to the wavelength of pump light for four-wave mixing are selected to be connected up to a length capable of providing a required conversion efficiency, thus obtaining a nonlinear optical medium greatly reduced in variations in zero-dispersion wavelength along the fiber length. By using this nonlinear optical medium to configure a phase conjugator, a broad conversion band can be obtained.

Although the zero-dispersion wavelengths $\lambda_{01}$ and $\lambda_{02}$ are substantially equal to each other, an optical fiber having a zero-dispersion wavelength greatly varying along the fiber length is conceivable. For example, in such an optical fiber, the distribution of the zero-dispersion wavelength along the fiber length is symmetrical with respect to the longitudinal center of the optical fiber. In such a case, the optical fiber is divided into at least two optical fiber sections prior to the process 120, and each optical fiber section is subjected to the process 120. Alternatively, the process 120 may be repeated plural times.

The above-mentioned manufacturing methods for a nonlinear optical medium are applicable also to a PMF. The effect obtained by the application to a PMF is as follows:

In the case that ideal dispersion management has been realized, the polarization state of each optical wave becomes a limiting condition of phase matching. Although the polarization states of signal light, pump light, and phase conjugate light are made coincident with each other at a fiber input end, the polarization states of optical waves having different wavelengths are gradually deviated by the effect of polarization dispersion during propagation in the fiber. This deviation increases with an increase in wavelength difference, causing a limit of the conversion band. The most effective method for eliminating this limit is to fix the polarization state in the fiber. More specifically, a PMF is preferably used as the nonlinear optical medium as previously mentioned with reference to FIG. 1 or 4. Accordingly, a DSF having a large nonlinear coefficient, ideal in zero-dispersion wavelength management, and having a PMF structure is ideal as a fiber four-wave mixer. By making the wavelength of pump light coincide with the zero-dispersion wavelength of this fiber, a four-wave mixer having a greatly broad conversion band can be provided.

Figure 7:
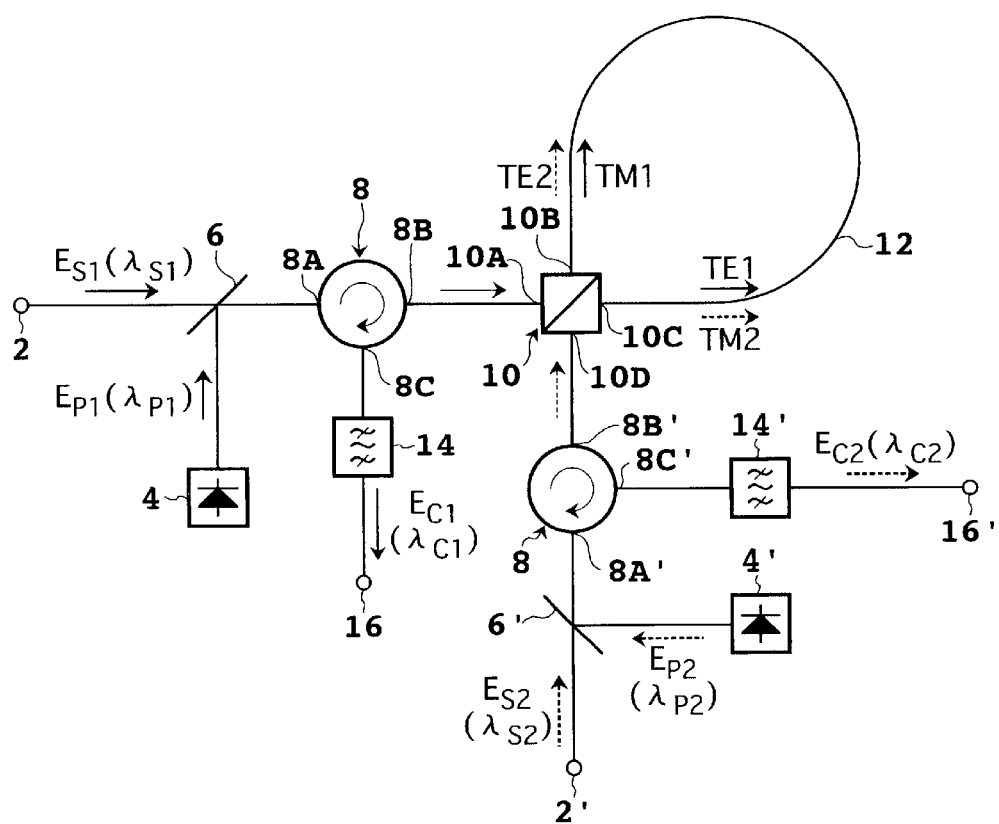
FIG. 7 is a diagram showing a third preferred embodiment of the device according to the present invention.

FIG. 7 is a diagram showing a third preferred embodiment of the device according to the present invention. In this preferred embodiment, there is shown a device usable for bidirectional transmission owing to the symmetry of operation of each of the polarization beam splitter 10 and the PMF 12.

Like the preferred embodiment shown in FIG. 1, phase conjugate light $E_{C1}$ (wavelength $\lambda_{C1}$) is generated by four-wave mixing in the PMF 12 on the basis of signal light $E_{S1}$ (wavelength $\lambda_{S1}$) and pump light $E_{P1}$ (wavelength $\lambda_{P1}$). In this preferred embodiment, the polarization beam splitter 10 has an additional port 10D, and the device is further provided with an input port 2', pumping source 4', optical coupler 6', optical circulator 8', optical band-pass filter 14', and output port 16' respectively corresponding to the input port 2, the pumping source 4, the optical coupler 6, the optical circulator 8, the optical band-pass filter 14, and the output port 16, in order to generate second phase conjugate light $E_{C2}$ (wavelength $\lambda_{C2}$) by four-wave mixing in the PMF 12 on the basis of second signal light $E_{S2}$ (wavelength $\lambda_{S2}$) and second pump light $E_{P2}$ (wavelength $\lambda_{P2}$). The ports 10B and 10D are coupled by a polarization component having a polarization plane parallel to the sheet plane of FIG. 7. The ports 10C and 10D are coupled by a polarization component having a polarization plane perpendicular to the sheet plane of FIG. 7. Accordingly, the second signal light $E_{S2}$ is separated into polarization components TM2 and TE2 in the polarization beam splitter 10 on the same principle as that where the signal light $E_{S1}$ is separated into polarization components TM1 and TE1.

With this configuration, the generation of the phase conjugate light $E_{C1}$ by the signal light $E_{S1}$ and the pump light $E_{P1}$ is performed in relation to one principal axis (Y axis) of the PMF 12, and the generation of the phase conjugate light $E_{C2}$ by the second signal light $E_{S2}$ and the second pump light $E_{P2}$ is performed in relation to the other principal axis (X axis) of the PMF 12. Therefore, the two phase conjugate lights $E_{C1}$ and $E_{C2}$ can be generated without mutual interference.

Accordingly, in a system having two channels of optical transmission lines, by applying the input port 2 and the output port 16 to one of the two channels and applying the input port 2' and the output port 16' to the other channel, the conversion can be performed on the two channels of optical transmission lines with a single device. The effects obtained by the first preferred embodiment as mentioned above in detail with reference to FIG. 1 can be obtained on each of the two channels, so the description thereof will be omitted herein.

Figure 8:
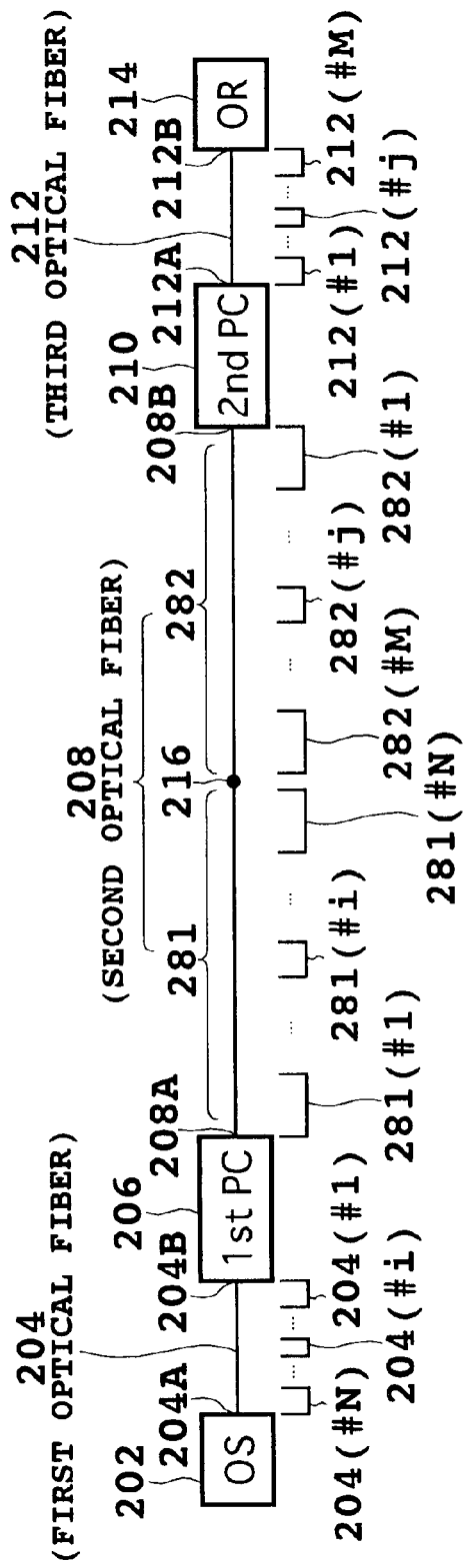
FIG. 8 is a block diagram for illustrating the basic principle of a photonic network.

An implementation of a photonic network using a phase conjugator will now be described. FIG. 8 is a block diagram for illustrating the principle of a photonic network.

An optical sender (OS) 202 outputs a signal beam.

A first optical fiber (fiber span) 204 has a first end 204A and a second end 204B respectively corresponding to an input end and an output end for the signal beam. A first phase conjugator (1st PC) 206 is operatively connected to the second end 204B.

The first phase conjugator 206 converts the signal beam supplied from the first optical fiber 204 into a first phase conjugate beam, and outputs the first phase conjugate beam.

A second optical fiber (fiber span) 208 has a third end 208A and a fourth end 208B respectively corresponding to an input end and an output end for the first phase conjugate beam. A second phase conjugator (2nd PC) 210 is operatively connected to the fourth end 208B.

The second phase conjugator 210 converts the first phase conjugate beam supplied from the second optical fiber 208 into a second phase conjugate beam, and outputs the second phase conjugate beam.

A third optical fiber 212 has a fifth end 212A and a sixth end 212B respectively corresponding to an input end and an output end for the second phase conjugate beam.

An optical receiver (OR) 214 is provided to receive the second phase conjugate beam transmitted by the third optical fiber 212.

A system midpoint 216 is set on the midway of the second optical fiber 208. The system midpoint 216 will be hereinafter defined.

The second optical fiber 208 consists of a first portion 281 extending between the third end 208A and the system midpoint 216, and a second portion 282 extending between the system midpoint 216 and the fourth end 208B.

In the present invention, parameters in the optical fibers 204, 208, and 212 are set in the following manner.

First, the first optical fiber 204 is virtually divided into N (N is an integer greater than 1) sections 204(#1) to 204(#N), and the first portion 281 of the second optical fiber 208 is also virtually divided into N sections 281(#1) to 281(#N), the number N of division being the same as that of the first optical fiber 204. In two corresponding ones of the sections 204(#1) to 204(#N) and the sections 281(#1) to 281(#N) counted from the first phase conjugator 206, the product of the average of chromatic dispersions and the length of one of the two corresponding sections is made coincident with the product of the average of chromatic dispersions and the length of the other one of the two corresponding sections. More specifically, letting $D_{1i}$ and $L_{1i}$ respectively denote the average of chromatic dispersions (or dispersion parameters) and the length of the i-th ($1 \leq i \leq N$) section 204(#i) in the first optical fiber 204 as counted from the first phase conjugator 206, and letting $D_{2i}$ and $L_{2i}$ respectively denote the average of chromatic dispersions (or dispersion parameters) and the length of the i-th section 281(#i) in the first portion 281 of the second optical fiber 208 as counted from the first phase conjugator 206, the following equation is satisfied.

$$D_{1i}L_{1i}=D_{2i}L_{2i} \quad (1)$$

Further, letting $P_{1i}$ and $Y_{1i}$ respectively denote the average of optical powers and the average of nonlinear coefficients in the i-th section 204(#i), and letting $P_{2i}$ and $\gamma_{2i}$ respectively denote the average of optical powers and the average of nonlinear coefficients in the i-th section 281(#i), the following equation is satisfied.

$$P_{1i}\gamma_{1i}L_{1i}=P_{2i}\gamma_{2i}L_{2i} \quad (2)$$

On the other hand, the second portion 282 of the second optical fiber 208 is virtually divided into M (M is an integer greater than 1) sections 282(#1) to 282(#M), and the third optical fiber 212 is also virtually divided into M sections 212(#1) to 212(#M), the number M of division being the same as that of the second portion 282.

Letting $D_{3j}$ and $L_{3j}$ respectively denote the average of chromatic dispersions and the length of the j-th ($1 \leq j \leq M$) section 282(#j) in the second portion 282 of the second optical fiber 208 as counted from the second phase conjugator 210, and letting $D_{4j}$ and $L_{4j}$ respectively denote the average of chromatic dispersions and the length of the j-th section 212(#j) in the third optical fiber 212 as counted from the second phase conjugator 210, the following equation is satisfied.

$$D_{3j}L_{3j}=D_{4j}L_{4j} \quad (3)$$

Further, letting $P_{3j}$ and $\gamma_{3j}$ respectively denote the average of optical powers and the average of nonlinear coefficients in the j-th section 282(#j), and letting $P_{4j}$ and $\gamma_{4j}$ respectively denote the average of optical powers and the average of nonlinear coefficients in the j-th section 212(#j), the following equation is satisfied.

$$P_{3j}\gamma_{3j}L_{3j}=P_{4j}\gamma_{4j}L_{4j} \quad (4)$$

In the system shown in FIG. 8, the waveform distortion becomes large once on the downstream side of the first phase conjugator 206. However, since the conditions of Eqs. (1) and (2) are satisfied, the chromatic dispersion and the nonlinearity are compensated at the system midpoint 216, so that the waveform is once returned to the original form. This restored waveform is distorted again on the downstream side of the second phase conjugator 210. However, since the conditions of Eqs. (3) and (4) are satisfied, the chromatic dispersion and the nonlinearity are compensated at the optical receiver 214 to thereby restore the original waveform.

The configuration shown in FIG. 8 is tolerant to a setting error of the length or other parameters of the second optical fiber 208 to be possibly placed on the sea bed or the like. That is, even though the waveform is not completely returned to the original form at the system midpoint 216, this incompleteness is regenerated in the second portion 282, the second phase conjugator 210, and the third optical fiber 212, thereby completely restoring the original waveform at the optical receiver 214.

Figure 9:
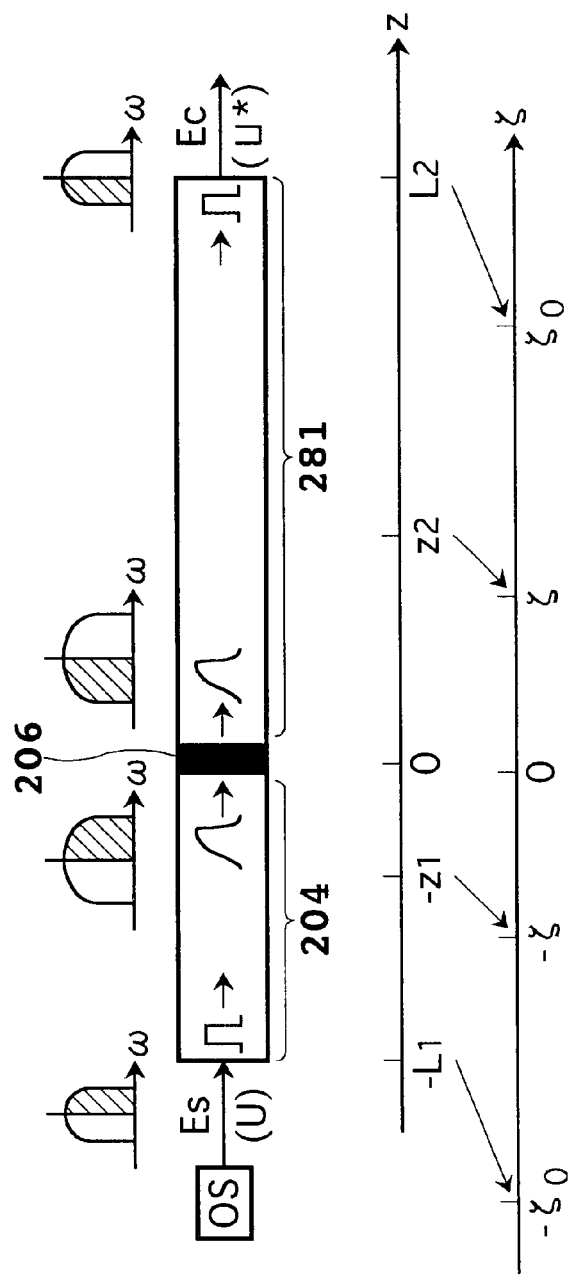
FIG. 9 is a diagram for illustrating the principle of compensation in FIG. 8.

Referring to FIG. 9, there is shown the principle of compensation for the chromatic dispersion and the nonlinearity in the configuration shown in FIG. 8. This compensation principle may be applied also to the other preferred embodiments. FIG. 9 illustrates the principle of compensation in the path from the optical sender 202 to the system midpoint 216. Prior to the description of the compensation principle with reference to FIG. 9, the general facts on phase conjugate waves will now be described.

The propagation of an optical signal E(x, y, z, t)=F(x, y)ϕ(z, t)exp[i(ωt−kz)] in optical fiber transmission can be generally described by the following nonlinear wave equation, in which F(x, y) represents a lateral mode distribution, and ϕ(z, t) represents a complex envelope of light. It is assumed that ϕ(z, t) changes much more slowly than the frequency ω of light.

$$i\frac{\partial \phi}{\partial z} - \left(\frac{1}{2}\right)\beta_2\frac{\partial^2 \phi}{\partial T^2} + \gamma|\phi|^2\phi = -\left(\frac{i}{2}\right)\alpha\phi \quad (5)$$

where $T=t-\beta_1 z$ ($\beta_1$: propagation constant), α is the fiber loss, $\beta_2$ is the chromatic dispersion of a fiber, and γ is the third-order nonlinear coefficient (the coefficient of optical Kerr effect).

$$\gamma = \frac{\omega n_2}{c A_{eff}} \quad (6)$$

In Eq. (6), $n_2$ and $A_{eff}$ are the nonlinear refractive index and effective core area of a fiber, respectively, and c is the velocity of light in the vacuum. In this case, the first-order dispersion is considered and the higher-order dispersion is omitted. Further, it is assumed that $\alpha$, $\beta$, and $\gamma$ are functions of z, i.e., they are represented by $\alpha(z)$, $\beta(z)$, and $\gamma(z)$, respectively. Further, the position of the phase conjugator is set to an origin (z=0). The following normalized function is now introduced.

$$\phi(z,T) = A(z) u(z,T) \quad (7)$$

where, $$A(z) \equiv A(0) \exp\left[-\left(\frac{1}{2}\right)\int_0^z \alpha(z)\, dz\right] \quad (8)$$

A(z) represents the amplitude, wherein it shows that when $\alpha(z)>0$, the transmission line has a loss, whereas when $\alpha(z)<0$, the transmission line has a gain. Further, $A(z) \equiv A(0)$ shows the transmission line has no loss. Further, $A(z)^2 = P(z)$ corresponds to optical power. Insertion of Eqs. (7) and (8) into Eq. (5) gives the following evolution equation.

$$i\frac{\partial u}{\partial z} = \left(\frac{1}{2}\right)\beta_2(z)\frac{\partial^2 u}{\partial T^2} - \gamma(z)A(z)^2|u|^2 u \quad (9)$$

The following transformation will now be made.

$$\zeta = \int_0^z |\beta_2(z)|\, dz \quad (10)$$

As a result, Eq. (9) can be transformed into the following equation.

$$i\frac{\partial u}{\partial \zeta} = \frac{sgn[\beta_2]}{2}\frac{\partial^2 u}{\partial T^2} - \frac{\gamma(\zeta)A(\zeta)^2}{|\beta_2(\zeta)|}|u|^2 u \quad (11)$$

where $sgn[\beta_2] \equiv \pm 1$ takes +1 in the case of $\beta_2>0$, i.e., normal dispersion, or takes -1 in the case of $\beta_2<0$, i.e., anomalous dispersion. If Eq. (11) holds, the complex conjugate of Eq. (11) also holds to obtain the following equation.

$$-i\frac{\partial u^*}{\partial \zeta} = \frac{sgn[\beta_2]}{2}\frac{\partial^2 u^*}{\partial T^2} - \frac{\gamma(\zeta)A(\zeta)^2}{|\beta_2(\zeta)|}|u^*|^2 u^* \quad (12)$$

The complex conjugate light u* follows the same evolution equation as that for u. However, the propagation direction is inverted. This operation is just the operation of a phase conjugator. Particularly in a transmission type phase conjugator, the above description is equivalent to inverting a phase shift due to chromatic dispersion and SPM.

In FIG. 9, $L_1$ denotes the length of the first optical fiber 204, and $L_2$ denotes the length of the first portion 281 of the second optical fiber 208. The phase conjugator 206 is located at the origin z=0 ($\zeta$=0) of z coordinates and $\zeta$ coordinates. The z coordinate and $\zeta$ coordinate of the system midpoint 216 are represented by $L_2$ and $\zeta_0$, respectively.

In the first optical fiber 204, a signal beam u ($E_S$) propagates in accordance with Eq. (11), the evolution equation. The signal beam u is converted into a phase conjugate beam u* ($E_C$) by the phase conjugator 206. The phase conjugate beam u* propagates in the first portion 281 of the second optical fiber 208 in accordance with Eq. (12), the evolution equation.

By setting the value of each parameter so that the coefficients of the first and second terms of the right side of Eq. (11) become equal to each other within a normalized distance $d\zeta$ between two arbitrary points $-\zeta$ and $\zeta$ symmetrical with respect to the position ($\zeta$=0) of the phase conjugator 206 on the $\zeta$ axis, u* at the point $\zeta$ becomes a phase conjugate wave of u at the point $-\zeta$. In other words, the following two equations are the conditions for compensation.

$$sgn[\beta_2(-\zeta)] = sgn[\beta_2(\zeta)] \quad (13)$$

$$\frac{\gamma(-\zeta)A(-\zeta)^2}{|\beta_2(-\zeta)|} = \frac{\gamma(\zeta)A(\zeta)^2}{|\beta_2(\zeta)|} \quad (14)$$

Eq. (13) shows that the signs of dispersions of the first optical fiber 204 and the first portion 281 must be the same. In consideration of the fact that $\gamma>0$ and $A(z)^2>0$, the above conditions can be summarized as follows:

$$\frac{\gamma(-\zeta)A(-\zeta)^2}{\beta_2(-\zeta)} = \frac{\gamma(\zeta)A(\zeta)^2}{\beta_2(\zeta)} \quad (15)$$

The phase shift due to chromatic dispersion and SPM at the point ($-\zeta$) in the first optical fiber 204 is inverted in sign by the phase conjugator 206. Accordingly, the waveform distortion due to this phase shift is compensated by the waveform distortion due to the phase shift at the point ($\zeta$) in the first portion 281. Such compensation by the above setting is repeated in each section to thereby allow compensation over the entire fiber length.

The above compensation condition will now be described in terms of z coordinates. Eq. (15) is rewritten as follows:

$$\frac{\gamma(-z_1)A(-z_1)^2}{\beta_2(-z_1)} = \frac{\gamma(z_2)A(z_2)^2}{\beta_2(z_2)} \quad (16)$$

In other words, the compensation condition is to equalize the ratio of the product of a nonlinear coefficient and an optical power to a chromatic dispersion in a certain section and the ratio of the product of a nonlinear coefficient and an optical power to a chromatic dispersion in the corresponding section. In Eq. (16), $-z_1$ and $z_2$ are two points satisfying the following equation.

$$\int_0^{-z_1}|\beta_2(z)|\, dz = -\int_0^{z_2}|\beta_2(z)|\, dz \quad (17)$$

From Eqs. (16) and (17), the following equations are obtained.

$$\beta_2(-z_1)\, dz_1 = \beta_2(z_2)\, dz_2 \quad (18)$$

$$\gamma(-z_1)A(-z_1)^2\, dz_1 = \gamma(z_2)A(z_2)^2\, dz_2 \quad (19)$$

In Eqs. (18) and (19), $dz_1$ and $dz_2$ are the lengths of small sections at the points $-z_1$ and $z_2$, respectively. The length of each small section is inversely proportional to a dispersion in the same small section or inversely proportional to the product of a nonlinear coefficient and an optical power in the same small section. In consideration of the relation between a dispersion $\beta_2$ and a dispersion parameter D, i.e., $D = -(2\pi c/\lambda^2)\beta_2$, the following relations are obtained from Eqs. (18)

and (19). The dispersion parameter D is a function of z, that is, it is represented by D(z).

$$D(-z_1)dz_1 = D(z_2)dz_2 \quad (20)$$

$$\gamma(-z_1)P(-z_1)dz_1 = \gamma(z_2)P(z_2)dz_2 \quad (21)$$

It is understood from Eqs. (20) and (21) that the compensation condition is to equalize an increment in each of dispersion and nonlinearity at one of two positions symmetrical with respect to the phase conjugator 206 and a decrement in each of dispersion and nonlinearity at the other position.

Eqs. (20) and (21) are necessary conditions for compensation, which show that the total dispersions of two corresponding sections are equal and that the total optical Kerr phase shifts of two corresponding sections are equal. That is, the effectiveness of the conditions of Eqs. (1) to (4) has now been confirmed.

Particularly in the case that $\alpha$, D, and $\gamma$ are constant and variations in power are small, the following equations are obtained by integrating Eqs. (20) and (21).

$$D_1 L_1 = D_2 L_2 \quad (22)$$

$$\gamma_1 P_1 L_1 = \gamma_2 P_2 L_2 \quad (23)$$

where $P_1$ and $P_2$ are the average powers in the first optical fiber 204 and the first portion 281, respectively. Further, $D_1$ and $\gamma_1$ are the average of dispersion parameters and the average of nonlinear coefficients of the first optical fiber 204, respectively, and $D_2$ and $\gamma_2$ are the average of dispersion parameters and the average of nonlinear coefficients of the first portion 281, respectively. Eqs. (22) and (23) are coincident with the conditions in dispersion compensation and SPM compensation by average approximation.

From the viewpoint of practicality, the present invention can be carried out by satisfying only the condition of Eq. (22). That is, according to the present invention, there is provided an optical fiber communication system comprising a first optical fiber having a first end and a second end respectively corresponding to an input end and an output end for a signal beam, a phase conjugator operatively connected to the second end for converting the signal beam into a phase conjugate beam and outputting the phase conjugate beam, and a second optical fiber having a third end and a fourth end respectively corresponding to an input end and an output end for the phase conjugate beam, wherein the product of the average of chromatic dispersions of the first optical fiber and the length of the first optical fiber is substantially equal to the product of the average of chromatic dispersions of the second optical fiber and the length of the second optical fiber.

Preferably, to satisfy the condition of Eq. (23), the product of the average of optical powers in the first optical fiber, the average of nonlinear coefficients in the first optical fiber, and the length of the first optical fiber is substantially equal to the product of the average of optical powers in the second optical fiber, the average of nonlinear coefficients in the second optical fiber, and the length of the second optical fiber.

In the case that a plurality of optical amplifiers are provided on an optical path including the first and second optical fibers, the spacing between any adjacent ones of the plural optical amplifiers is preferably set shorter than the nonlinear length of the optical path (optical fiber).

While FIG. 9 shows the principle of compensation on the upstream side of the system midpoint 216, the principle of compensation on the downstream side of the system midpoint 216 can be similarly understood, so the description thereof will be omitted herein.

In the description with reference to FIG. 9, the normalized coordinates are defined by the accumulated value of chromatic dispersions from the phase conjugator 206 as shown by Eq. (10). As a result, the required condition is that at two corresponding points on the first optical fiber 204 and the first portion 281 where the accumulated values of chromatic dispersions from the phase conjugator 206 are equal to each other, the ratio of the product of an optical power and a nonlinear coefficient to a chromatic dispersion at one of the two corresponding points is substantially equal to the ratio of the product of an optical power and a nonlinear coefficient to a chromatic dispersion at the other point as shown by Eq. (15).

Alternatively, the normalized coordinates in FIG. 9 may be defined by the accumulated value of nonlinear effects (i.e., the accumulated value of the products of optical powers and nonlinear coefficients) from the phase conjugator 206. In this case, the required condition is that at two corresponding points on the first optical fiber 204 and the first portion 281 where the above-mentioned accumulated values are equal to each other, the ratio of the product of an optical power and a nonlinear coefficient to a chromatic dispersion at one of the two corresponding points is substantially equal to the ratio of the product of an optical power and a nonlinear coefficient to a chromatic dispersion at the other point.

As described above, between the first optical fiber and the second optical fiber both connected to the phase conjugator, the total dispersion of the first optical fiber is set equal to the total dispersion of the second optical fiber, and the total quantity of optical Kerr effects in the first optical fiber is set equal to the total quantity of optical Kerr effects in the second optical fiber, so that waveform distortion is compensated by the phase conjugator in such a manner that the waveform of an optical pulse input into the first optical fiber becomes substantially the same as the waveform of an optical pulse output from the second optical fiber. In other words, at the transmitting end of an optical pulse (the input end of the first optical fiber) and the receiving end of an optical pulse (the output end of the second optical fiber), the optical pulse waveforms having substantially the same shape can be obtained. Accordingly, by providing optical ADMs (add/drop multiplexers) at the input end and the output end, a receiving optical pulse can be received in the same condition as that of a transmitted optical pulse. As a result, at each ADM the regeneration (waveform shaping and retiming) of a receiving optical pulse can be omitted without degradation in SNR of the receiving optical pulse, thereby allowing the construction of a flexible system. There will now be described a so-called photonic network utilizing this principle.

Since the device according to the present invention has a broad conversion band, it can be effectively applied to wavelength division multiplexing. This application will now be described more specifically.

Figure 10:
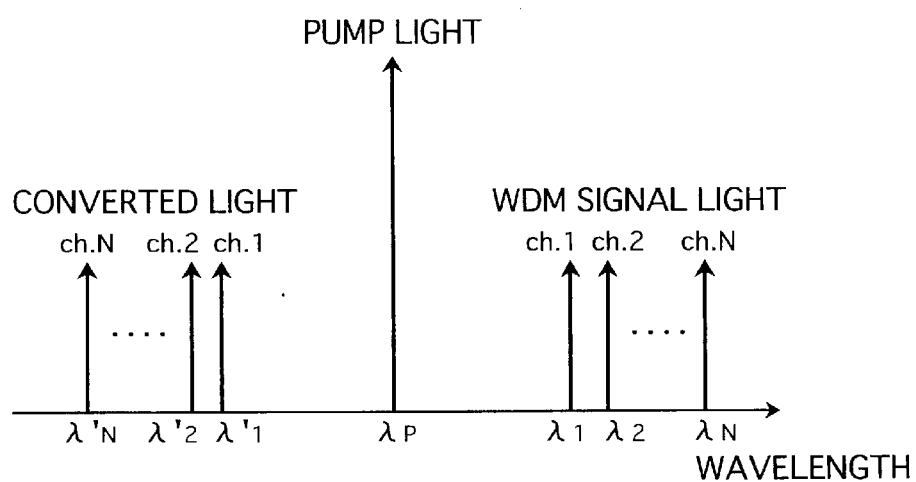
FIG. 10 is a diagram for illustrating simultaneous conversion of WDM signal light.

FIG. 10 is a diagram for illustrating simultaneous (multichannel) conversion of WDM signal light by a phase conjugator having a broad conversion band. The WDM signal light is obtained by wavelength division multiplexing (WDM) N channels of optical signals having different wavelengths $\lambda_1$ to $\lambda_N$. It is assumed that $\lambda_1$ is the shortest wavelength and $\lambda_N$ is the longest wavelength. The wavelength $\lambda_P$ of pump light is set shorter than $\lambda_1$, for example. The WDM signal light is converted into converted light by nondegenerate four-wave mixing using the pump light. The converted light is composed of N channels of converted optical signals having different wavelengths $\lambda_1'$ to $\lambda_N'$. The wavelengths $\lambda_i$ and $\lambda_i'$ ($1 \leq i \leq N$) of the WDM signal light and the converted light are arranged symmetrically with respect to the wavelength $\lambda_P$ of the pump light.

In four-wave mixing using an optical fiber or a PMF as a nonlinear optical medium, the conversion band is substantially flat. Accordingly, wavelength conversion and phase conjugate conversion can be performed with substantially the same conversion efficiency to the optical signals of all the channels. Accordingly, waveform distortion due to chromatic dispersion and nonlinear effect in a transmission line can be compensated for each channel, thereby allowing long-haul, large-capacity transmission. While the conversion from a longer-wavelength band to a shorter-wavelength band is shown in FIG. 10, it is needless to say that the conversion from a shorter-wavelength band to a longer-wavelength band can be made similarly, because the conversion band by an optical fiber is symmetrical with respect to a zero-dispersion wavelength.

Figure 11:
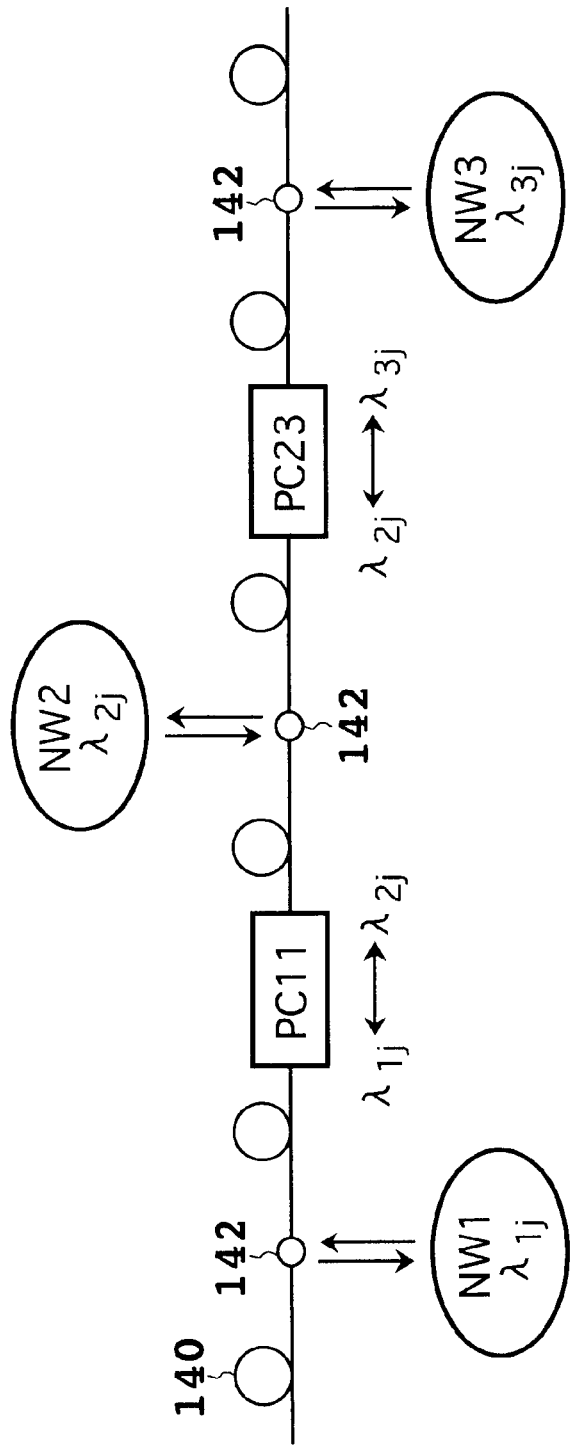
FIG. 11 is a block diagram showing a second preferred embodiment of the system according to the present invention.

FIG. 11 is a block diagram showing a second preferred embodiment of the system according to the present invention. A plurality of optical fiber networks NW1, NW2, and NW3 each adopting WDM are connected by an optical fiber transmission line 140 and nodes 142. A phase conjugator PC11 is provided on the midway of the optical fiber transmission line 140 to perform conversion between the networks NW1 and NW2, and a phase conjugator PC23 is provided on the midway of the optical fiber transmission line 140 to perform conversion between the networks NW2 and NW3. In the networks NW1, NW2, and NW3, WDM transmission in different wavelength bands $\lambda_{1j}$, $\lambda_{2j}$, and $\lambda_{3j}$ is carried out, respectively. The phase conjugator PC11 performs wavelength conversion and phase conjugate conversion between the wavelength bands $\lambda_{1j}$ and $\lambda_{2j}$, and the phase conjugator PC23 performs wavelength conversion and phase conjugate conversion between the wavelength bands $\lambda_{2j}$ and $\lambda_{3j}$. There are some positions on the optical fiber transmission line 140 where waveform distortion due to chromatic dispersion and nonlinear effect can be compensated for according to the present invention. Accordingly, the nodes 142 are located at these positions. Each node 142 includes an optical add/drop multiplexer for adding and dropping an optical signal. The optical add/drop multiplexer functions to all or part of the channels of WDM signal light or converted light. For example, in the case that the wavelength band $\lambda_{1j}$ of the optical fiber network NW1 is given by the wavelength region of the WDM signal light shown in FIG. 10 and the wavelength of pump light in the phase conjugator PC11 is $\lambda_P$, the wavelength band $\lambda_{2j}$ of the optical fiber network NW2 is given by the wavelength region of the converted light.

With such a system configuration, waveform distortion compensation and wavelength conversion by a phase conjugator can be effectively utilized, thereby allowing construction of a long-haul, large-capacity flexible system. Further, such application to the transmission between networks has recently become important especially in the following points.

(1) Broadening of the gain bandwidth of an optical amplifier.

(2) Widening of variety of dispersion of an optical fiber used as a transmission line.

The first point (1) is related to recent broadening of the gain bandwidth of an EDFA (erbium doped fiber amplifier), and the second point (2) is related to speed-up of a transmitted signal and dispersion management for WDM transmission. There has recently been developed an EDFA having a broad gain bandwidth of more than 50 nm and excellent in gain flatness as intended for WDM. It is expected that the gain bandwidth will be further broadened in the future, and for example, an EDFA having a broad gain bandwidth of about 60–80 nm will be developed. While it is needless to say that such broadening of the gain bandwidth of an EDFA is useful for increasing the number of WDM channels (transmission capacity), the gain bandwidth broadening enables introduction of a new concept in the transmission between networks shown in FIG. 11, for example.

Figure 12:
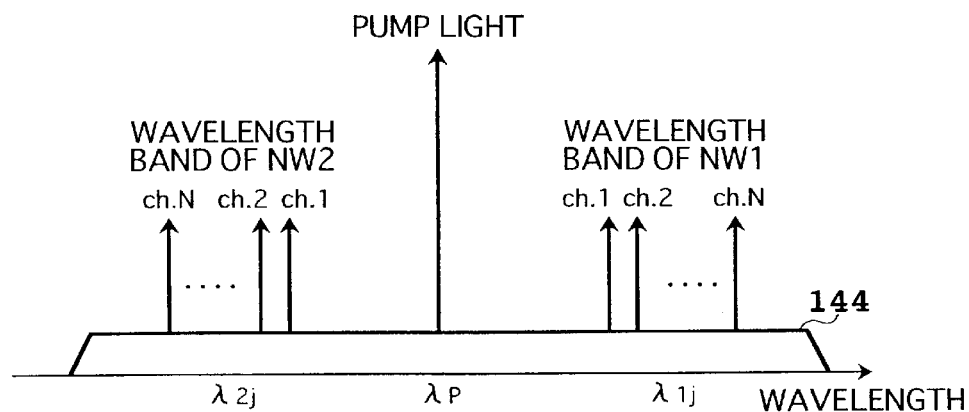
FIG. 12 is a diagram showing an example of setting of the wavelength bands in the system according to the present invention.

For example, in the case that the wavelength bands of the optical fiber networks NW1 and NW2 shown in FIG. 11 are set as shown in FIG. 12, effective transmission according to the present invention is allowed between the optical fiber networks NW1 and NW2. In FIG. 12, reference numeral 144 denotes a relatively flat gain band of an optical amplifier (e.g., EDFA). one of the reasons for such difference between the wavelength bands of the networks is that optical fibers used as the transmission lines in the networks are different. A 1.3-µm zero-dispersion single-mode fiber (so-called standard SMF) and a 1.55-µm dispersion shifted fiber (DSF) are known as optical fibers practically used at present. On the other hand, recent developments in EDFAs show that the wavelength band for high-speed, long-haul transmission in particular has mainly become a 1.55-µm band. That is, the standard SMF shows a large anomalous dispersion of about +16–+20 ps/nm/km, whereas the DSF can suppress the dispersion down to a small value of about ±1–2 ps/nm/km, so that the DSF is advantageous over the standard SMF for high-speed, long-haul transmission in a 1.55-µm band. However, many standard SMFs have already been installed, and there are many networks that are obliged to use the standard SMFs as the transmission lines. In connecting such a network using a standard SMF to another network using a DSF, it is necessary to perform wavelength conversion from the wavelength band of the network using the standard SMF to a wavelength band giving an optimum dispersion of the DSF. In such a case, the present invention is accordingly effective.

Moreover, also in connecting networks each using a DSF, the present invention is effective, because smaller dispersions are not always advantageous in WDM. In relatively high-speed WDM, the power level in each channel must be set to a considerably high level, so as to ensure a required signal-to-noise ratio (SNR). In this case, if the dispersion of an optical fiber used as the transmission line is small, there occurs interchannel crosstalk due to four-wave mixing, causing a degradation in transmission characteristics. To avoid this effect, there is a recent case of using a nonzero dispersion-shifted fiber having a zero-dispersion wavelength largely shifted from a signal band to have a relatively large dispersion. In this manner, a wide variety of optical fibers have now been used as the transmission line, so that networks using various wavelength bands can be constructed. Accordingly, in connecting such networks, the present invention intended to realize broadband wavelength conversion and phase conjugate conversion becomes effective.

While a wide variety of EDFAs have also been used in recent years, the most general EDFA is of a type having gain peaks in a 1.53-µm band and in a 1.55-µm band. The former band is called a blue band, and the latter band is called a red band.

Figure 13:
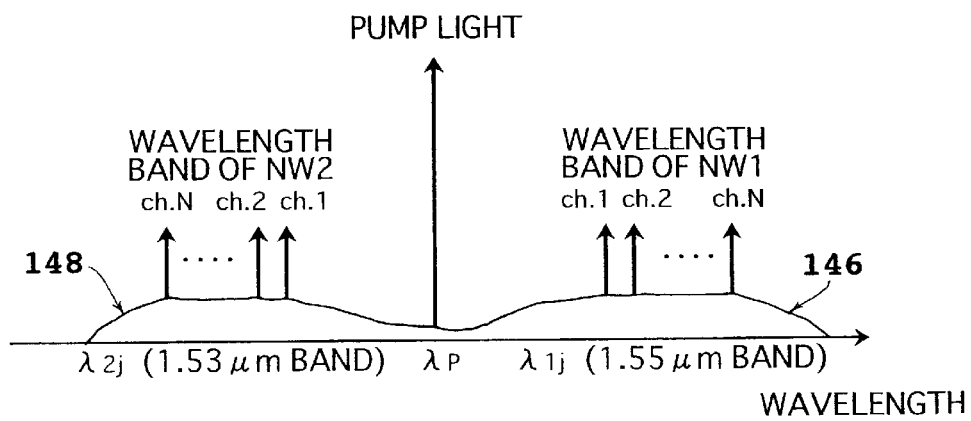
FIG. 13 is a diagram showing another example of setting of the wavelength bands in the system according to the present invention.

FIG. 13 is a diagram showing another example of setting of the wavelength bands in FIG. 11. In this example, the wavelength band of the optical fiber network NW1 is included in the red band of the EDFA as shown by reference numeral 146, and the wavelength band of the optical fiber network NW2 is included in the blue band of the EDFA as shown by reference numeral 148. By this setting, in the case that the optical fiber transmission line 140 or each network includes in-line EDFAS, phase conjugate conversion between the red band and the blue band can be easily carried out.

Figure 14:
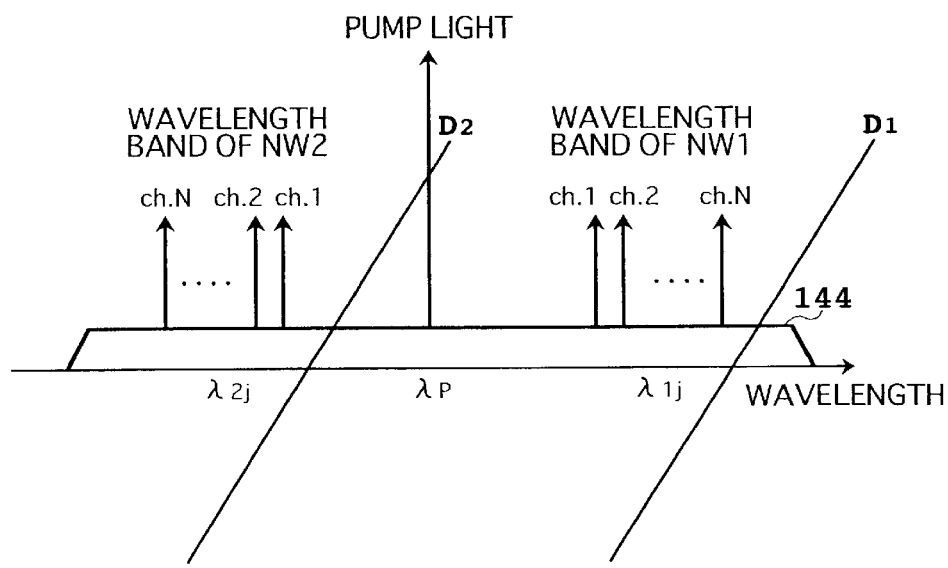
FIG. 14 is a diagram showing an example of dispersion allocation in the system according to the present invention.

FIG. 14 is a diagram showing an example of dispersion allocation in FIG. 11. $D_1$ and $D_2$ (ps/nm/km in unit for each) represent the dispersions in the optical fiber networks NW1 and NW2, respectively. In this example, WDM is performed in each network by using a normal dispersion fiber. It is expected that the influences of dispersion in two corresponding channels are different between before conversion and after conversion, because the channel location is inverted by the wavelength conversion as shown in FIG. 10. However, this problem can be solved by making the influences of dispersion substantially equal between near center channels and by performing dispersion compensation in each network. The dispersion in each network may be normal dispersion or anomalous dispersion.

As described above, according to the present invention, there is provided an optical fiber communication system comprising a plurality of optical fiber networks for WDM signal light obtained by wavelength division multiplexing (WDM) a plurality of optical signals having different wavelengths, and at least one converter for connecting these optical fiber networks. The converter performs simultaneous wavelength conversion and phase conjugate conversion of the plural optical signals, thereby easily constructing a long-haul, large-capacity flexible system.

Recently, an EDFA having a flat gain over a wavelength region including the red band and the blue band has been developed. By codoping an erbium doped fiber with a high concentration of aluminum and using a gain equalizer in combination, an optical amplifier having a gain bandwidth of about 40 nm (at about 1525–1565 nm) has been realized. This band is sometimes called a C band.

On the other hand, an optical amplifier having a flat gain in a band of 1570–1610 nm shifted from the C band toward longer wavelengths is now being developed. This band is sometimes called an L band. This optical amplifier is called a gain-shifted EDFA. By making the length of an aluminum-codoped EDFA larger than the length of an EDFA having a C band, the gain in the L band can be ensured although the gain per unit length in the L band is originally small.

By combining an optical amplifier having a C band and an optical amplifier having an L band in parallel, an optical amplifier having a gain bandwidth of about 80 nm has been developed. Further, by using a telluride-based EDFA, an optical amplifier having a gain bandwidth of about 80 nm is now being developed.

Figure 15:
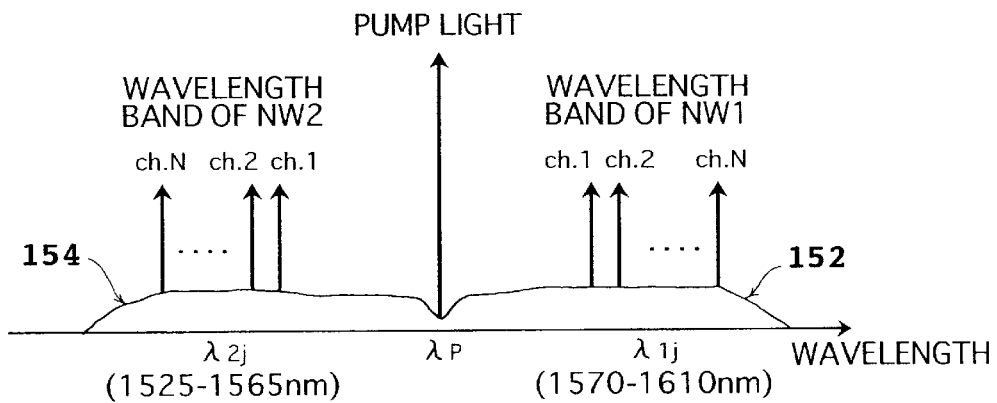
FIG. 15 is a diagram showing still another example of setting of the wavelength bands in the system according to the present invention.

FIG. 15 is a diagram showing still another example of setting of the wavelength bands in FIG. 11. In this example, the wavelength band of the optical fiber network NW1 is included in an L band shown by reference numeral 152, and the wavelength band of the optical fiber network NW2 is included in a C band shown by reference numeral 154.

According to the present invention, a broad conversion band is obtained. Accordingly, the combination of the device according to the present invention and an optical amplifier having a broad gain band is greatly useful for construction of a long-haul, large-capacity flexible system.

Figure 16:
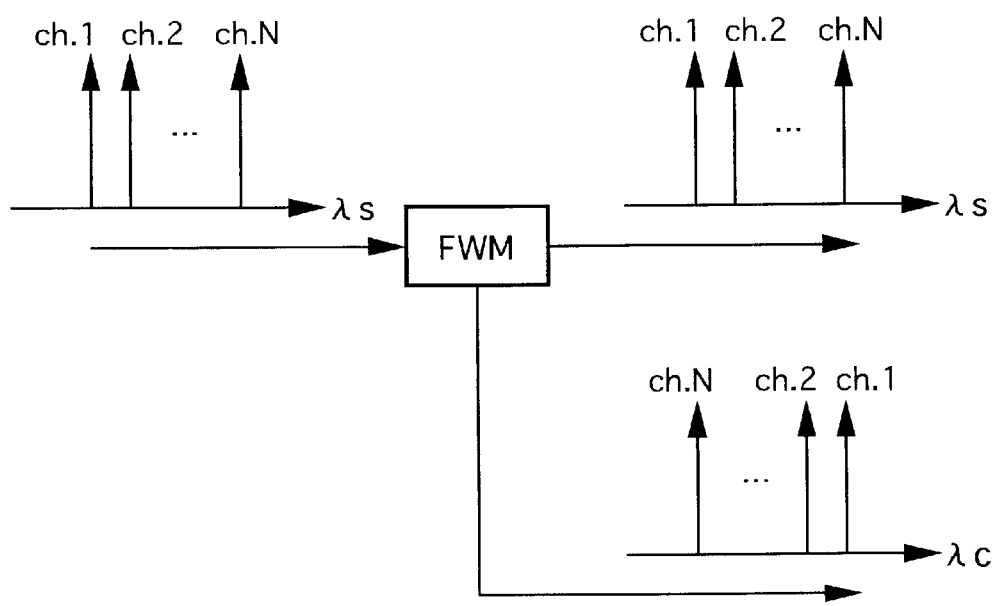
FIG. 16 is a diagram for illustrating a four-wave mixer.

In general, when WDM signal light is input to a four-wave mixer FWM, the WDM signal light and converted light are output from the four-wave mixer FWM as shown in FIG. 16. The four-wave mixer FWM may be provided by the device according to the present invention or a phase conjugator. In a four-wave mixer having a sufficiently high efficiency, input signal light is amplified by the parametric effect. Letting G denote the parametric gain to the signal light, the converted light gives a gain (G−1). Thus, the four-wave mixer has a main feature that it transmits the signal light and can also output the converted light. By utilizing this feature, a four-wave mixer can be applied to a WDM network in the following manner.

Figure 17:
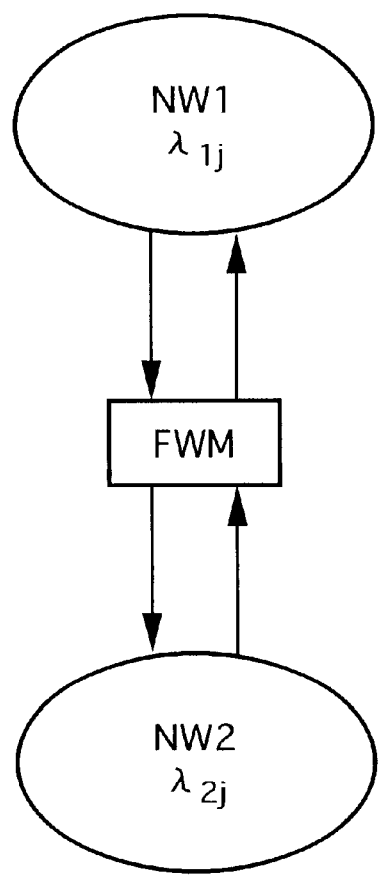
FIG. 17 is a block diagram showing a third preferred embodiment of the system according to the present invention.

FIG. 17 is a block diagram showing a third preferred embodiment of the system according to the present invention. In this preferred embodiment, optical fiber networks NW1 and NW2 as mentioned above with reference to FIG. 11 are connected by a four-wave mixer FWM to allow conversion between a wavelength band $\lambda_{1j}$ and a wavelength band $\lambda_{2j}$. The four-wave mixer FWM may be provided by the device shown in FIG. 7, which allows bidirectional transmission.

Figure 18:
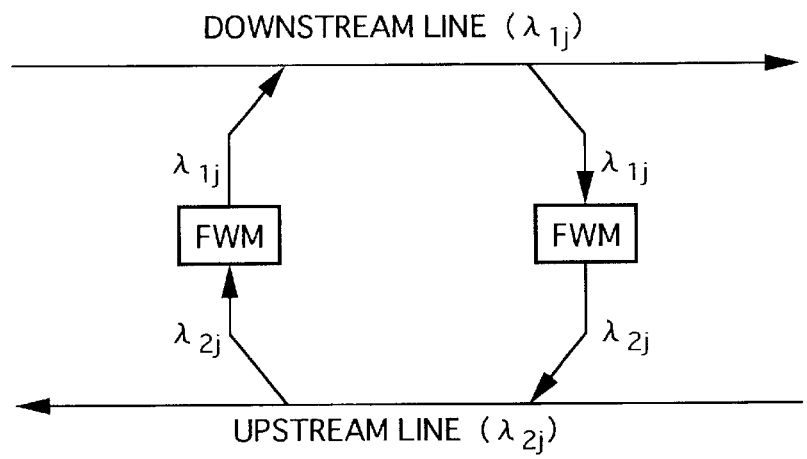
FIG. 18 is a block diagram showing a fourth preferred embodiment of the system according to the present invention.

FIG. 18 is a block diagram showing a fourth preferred embodiment of the system according to the present invention. Each of the optical fiber networks NW1 and NW2 should be regarded as including the function of a usual transmission line. That is, in the case that bidirectional transmission as shown in FIG. 18 is carried out, the downstream line and the upstream line shown in FIG. 18 should be understood as the optical fiber networks NW1 and NW2, respectively.

In the system shown in FIG. 18, a four-wave mixer FWM for converting a wavelength band $\lambda_{1j}$ into a wavelength band $\lambda_{2j}$ is provided to perform loop-back from the downstream line to the upstream line, and another four-wave mixer FWM for converting the wavelength band $\lambda_{2j}$ into the wavelength band $\lambda_{1j}$ is provided to perform loop-back from the upstream line to the downstream line. Each four-wave mixer FWM may be provided by the device shown in FIG. 1 or 4. Alternatively, these two four-wave mixers FWMs may be provided by the single device shown in FIG. 7.

Having thus described various applications wherein all the channels of WDM signal light subjected to simultaneous wavelength conversion are transferred, an arbitrary one of the channels of WDM signal light can be transferred by using an optical ADM as mentioned above in combination, thereby allowing construction of a more flexible system.

Figure 19:
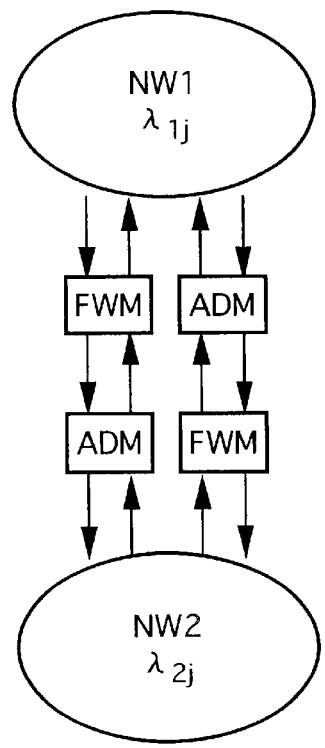
FIG. 19 is a block diagram showing a fifth preferred embodiment of the system according to the present invention.

FIG. 19 is a block diagram showing a fifth preferred embodiment of the system according to the present invention. In this preferred embodiment, WDM signal light having a wavelength band $\lambda_{1j}$ in an optical fiber network NW1 is converted into converted light by a four-wave mixer FWM, and an arbitrary wavelength channel is dropped according to this converted light by an optical add/drop multiplexer ADM. Then, the dropped signal is fed to an optical fiber network NW2. Similarly, WDM signal light having a wavelength band $\lambda_{2j}$ in the optical fiber network NW2 is converted into converted light by another four-wave mixer FWM, and an arbitrary wavelength channel is dropped according to this converted light by another optical add/drop multiplexer ADM. Then, the dropped signal is fed to the optical fiber network NW1.

Figure 20:
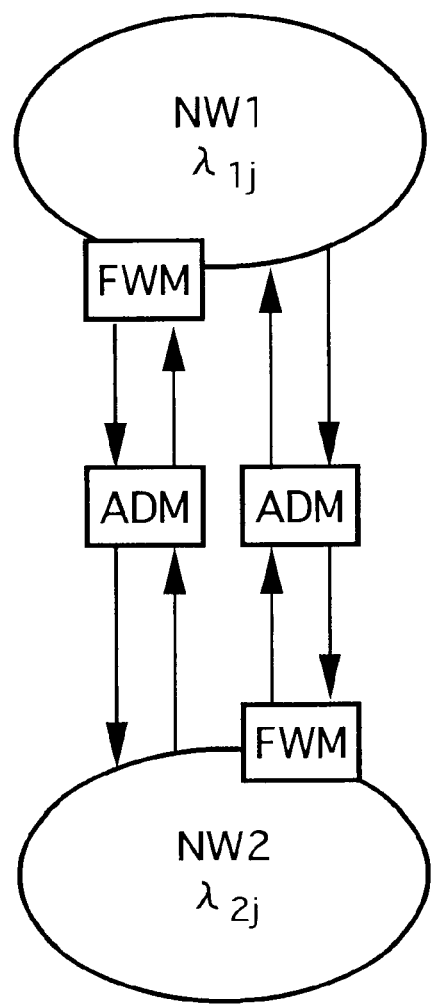
FIG. 20 is a block diagram showing a sixth preferred embodiment of the system according to the present invention.

FIG. 20 is a block diagram showing a sixth preferred embodiment of the system according to the present invention. In contrast to the system shown in FIG. 19, the system shown in FIG. 20 is characterized in that first and second four-wave mixers FWMs are included in optical fiber networks NW1 and NW2, respectively. Accordingly, in the optical fiber network NW1, WDM signal light having a wavelength band $\lambda_{1j}$ can be passed through the first four-wave mixer FWM. Similarly, in the optical fiber network NW2, WDM signal light having a wavelength band $\lambda_{2j}$ can be passed through the second four-wave mixer FWM. Like the system shown in FIG. 18, the system shown in FIG. 20 can also be applied to bidirectional transmission or the like.

Figure 21:
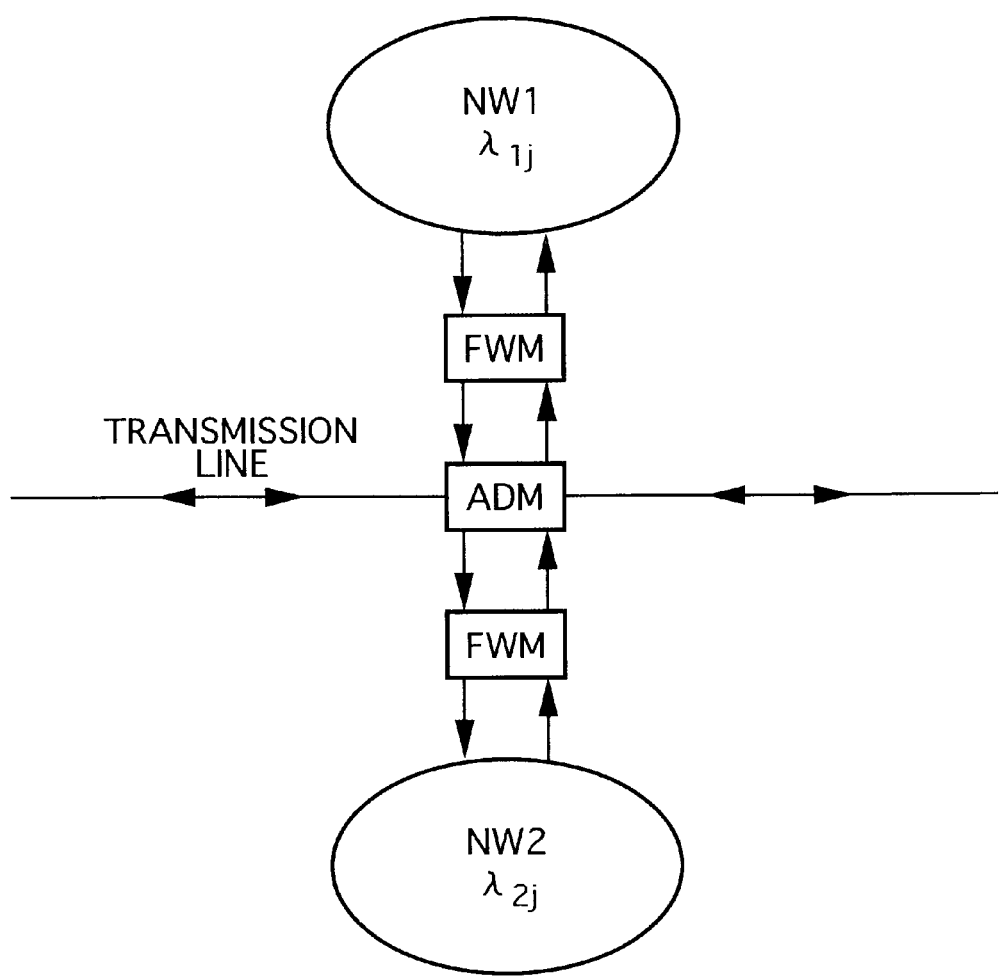
FIG. 21 is a block diagram showing a seventh preferred embodiment of the system according to the present invention.

FIG. 21 is a block diagram showing a seventh preferred embodiment of the system according to the present invention. An optical add/drop multiplexer ADM is provided on a transmission line. A signal of an arbitrary wavelength channel is dropped by the optical add/drop multiplexer ADM from WDM signal light transmitted by the transmission line, and this dropped signal is subjected to wavelength conversion into the wavelength bands $\lambda_{1j}$ and $\lambda_{2j}$ of optical fiber networks NW1 and NW2 by four-wave mixers FWMs. Then, the converted lights from the four-wave mixers FWMs are fed to the optical fiber networks NW1 and NW2. Conversely, WDM signal light in each optical fiber network is subjected to wavelength conversion into a wavelength band of the transmission line by the corresponding four-wave mixer FWM, and a signal of a required wavelength channel is dropped from the converted light and fed to the transmission line.

Figure 22:
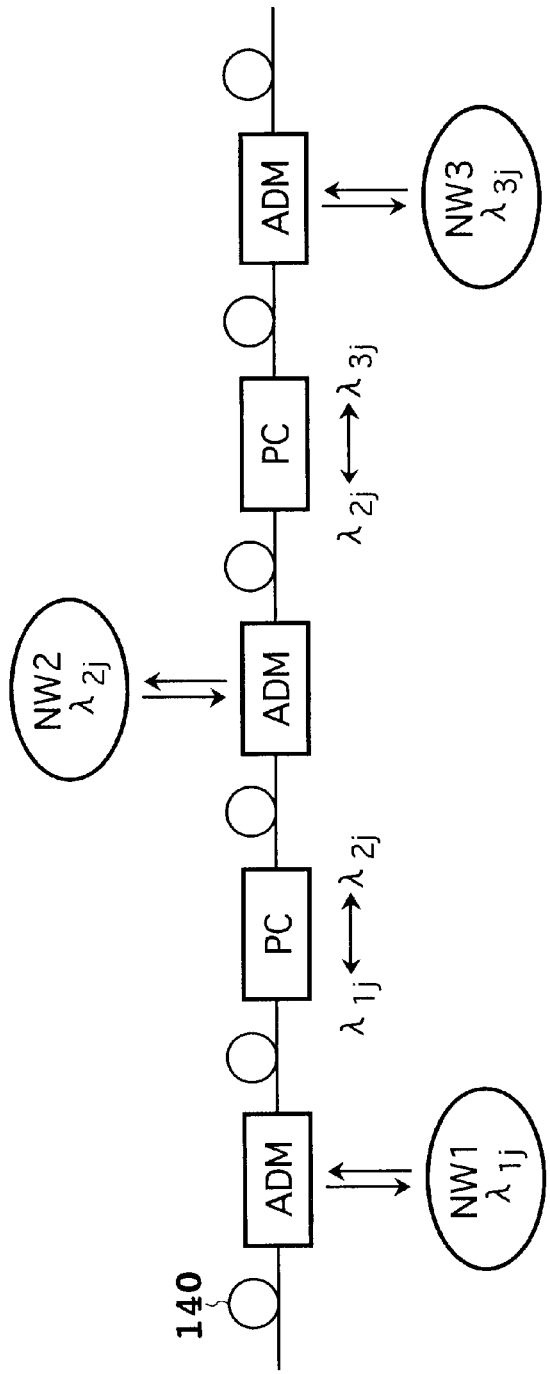
FIG. 22 is a block diagram showing an eighth preferred embodiment of the system according to the present invention.

FIG. 22 is a block diagram showing an eighth preferred embodiment of the system according to the present invention. In contrast to the system shown in FIG. 11, the system shown in FIG. 22 is characterized in that optical add/drop multiplexers ADMs are provided in place of the nodes 142. The optical add/drop multiplexers ADMs are provided on the optical fiber transmission line 140 at specific points where waveform distortion can be most compensated by the phase conjugators PCs. In each optical add/drop multiplexer ADM, a signal of an arbitrary wavelength channel is added or dropped.

Figure 23:
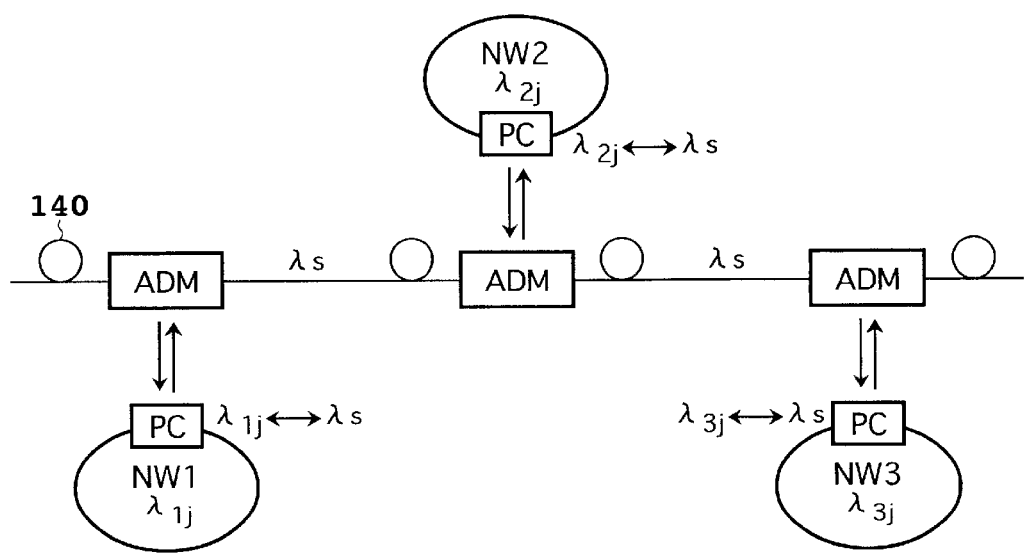
FIG. 23 is a block diagram showing a ninth preferred embodiment of the system according to the present invention.

FIG. 23 is a block diagram showing a ninth preferred embodiment of the system according to the present invention. In this preferred embodiment, a common wavelength band $\lambda_s$ is set in the optical fiber transmission line 140, and phase conjugators PCs are included in the optical fiber networks NW1, NW2, and NW3. In each phase conjugator PC, wavelength conversion and waveform distortion compensation are performed. A signal of an arbitrary wavelength channel is dropped from the converted light by each optical add/drop multiplexer ADM, and then fed to the optical fiber transmission line 140. Conversely, a signal of an arbitrary wavelength channel is dropped from the optical fiber transmission line 140 by each optical add/drop multiplexer ADM, and the dropped signal is subjected to wavelength conversion into the wavelength band of each network by using the corresponding phase conjugator PC. Then, the converted signal is fed into the corresponding network.

As described above, according to the present invention, it is possible to provide a device for phase conjugate conversion and wavelength conversion which has a broad conversion band. Further, according to the present invention, it is possible to provide a device for phase conjugate conversion and wavelength conversion in which the efficiency of conversion from signal light into converted light is not dependent on the polarization state of the signal light to be converted. Further, according to the present invention, it is also possible to provide a novel flexible system suitable for large-capacity transmission.

What is claimed is:

1. A device comprising:
    an optical circulator having first, second, and third ports, said first port being supplied with signal light including first and second polarization components respectively having first and second polarization planes orthogonal to each other, and with pump light;
    a polarization beam splitter having fourth, fifth, and sixth ports, said fourth port being optically connected to said second port, said fourth and fifth ports being coupled by said first polarization plane, said fourth and sixth ports being coupled by said second polarization plane; and
    a polarization maintaining fiber having first and second ends, and having a polarization mode to be maintained between said first and second ends, said first end being optically connected to said fifth port so that said first polarization plane is adapted to said polarization mode, said second end being optically connected to said sixth port so that said second polarization plane is adapted to said polarization mode.

2. A device according to claim 1, wherein said polarization maintaining fiber has a substantially constant zero-dispersion wavelength in relation to said polarization mode, and said pump light has a wavelength substantially equal to said zero-dispersion wavelength.

3. A device according to claim 1, wherein said signal light is converted into converted signal light by four-wave mixing based on said signal light and said pump light in said polarization maintaining fiber, said converted signal light being output from said third port of said optical circulator.

4. A device according to claim 3, wherein said converted signal light is a phase conjugate of said signal light.

5. A device according to claim 3, wherein:
    said pump light has a third polarization plane; said third polarization plane being set so that the efficiency of conversion from said signal light to said converted signal light is independent of the polarization state of said signal light.

6. A device according to claim 3, wherein said signal light, said pump light, and said converted signal light have angular frequencies $\omega_S$, $\omega_P$, and $\omega_C$, respectively, said angular frequencies $\omega_S$, $\omega_P$, and $\omega_C$ substantially satisfying the relation of $2\omega_P = \omega_S + \omega_C$.

7. A device according to claim 3, further comprising an optical band-pass filter optically connected to said third port of said optical circulator and having a passband including the wavelength of said converted signal light.

8. A device according to claim 1, wherein said polarization maintaining fiber has first and second principle axes orthogonal to each other, and said polarization mode corresponds to one of said first and second principal axes.

9. A device according to claim 1, further comprising:
    a pumping source for outputting said pump light; and
    an optical coupler optically connected to said first port of said optical circulator for combining said signal light and said pump light.

10. A device according to claim 1, further comprising means for modulating or dithering the frequency or phase of said pump light.

11. A device comprising:
    a polarization beam splitter having first, second, and third ports, said first port being supplied with signal light including first and second polarization components respectively having first and second polarization planes orthogonal to each other, and with pump light, said first and second ports being coupled by said first polarization plane, said first and third ports being coupled by said second polarization plane; and
    a polarization maintaining fiber having first and second ends, and having a polarization mode to be maintained between said first and second ends, said first end being optically connected to said second port so that said first polarization plane is adapted to said polarization mode, said second end being optically connected to said third port so that said second polarization plane is adapted to said polarization mode;

wherein said polarization mode to be maintained by said polarization maintaining fiber is given by a predetermined principal axis;

said first polarization plane of said signal light in said second port includes said predetermined principal axis; and said second polarization plane of said signal light in said third port includes said predetermined principal axis.

12. A device, comprising:

a polarization beam splitter having first, second, and third ports, said first port being supplied with signal light including first and second polarization components respectively having first and second polarization planes orthogonal to each other, with pump light, said first and second ports being coupled by said first polarization plan, said first and third ports being coupled by said second polarization plane;

a polarization maintaining fiber having first and second ends, and having a polarization mode to be maintained between said first and second ends, said first end being optically connected to said second port so that said first polarization plane is adapted to said polarization mode, said second end being optically connected to said third port so that said second polarization plane is adapted to said polarization mode; and an optical circulator optically connected to said first port of said polarization beam splitter.

13. A device, comprising:

polarization beam splitter having first, second, and third ports, said first port being supplied with signal light including first and second polarization components respectively having first and second polarization planes orthogonal to each other, with pump light, said first and second ports being coupled by said first polarization plan, said first and third ports being coupled by said second polarization plane; and a polarization maintaining fiber having first and second ends, and having a polarization mode to be maintained between said first and second ends, said first end being optically connected to said second port so that said first polarization plane is adapted to said polarization mode, said second end being optically connected to said third port so that said second polarization plane is adapted to said polarization mode; and wherein said polarization maintaining fiber has a substantially constant zero-dispersion wavelength in relation to said polarization mode, and said pump light has a wavelength substantially equal to said zero-dispersion wavelength.

14. A system comprising:

first and second optical fiber networks each adapted to wavelength division multiplexing; and a converter connected between said first and second optical fiber networks, said converter converting signal light into converted signal light by nonlinear optical effect based on said signal light and pump light, wherein said converter comprises:

a pumping source for outputting pump light;

an optical circulator having first, second, and third ports, said first port being supplied with signal light including first and second polarization components respectively having first and second polarization planes orthogonal to each other, and with said pump light;

a polarization beam splitter having fourth, fifth, and sixth ports, said fourth port being optically connected to said second port, said fourth and fifth ports being coupled by said first polarization plane, said fourth and sixth ports being coupled by said second polarization plane; and a polarization maintaining fiber having first and second ends, and having a polarization mode to be maintained between said first and second ends, said first end being optically connected to said fifth port so that said first polarization plane is adapted to said polarization mode, said second end being optically connected to said sixth port so that said second polarization plane is adapted to said polarization mode.

15. A system according to claim 14, wherein said signal light is converted into said converted signal light by a second-order or third order nonlinear optical effect.

16. A system according to claim 14, wherein said signal light is converted into said converted signal-light by four-wave mixing based on said signal light and said pump light.

17. A system according to claim 14, wherein said converted signal light is a phase conjugate of said signal light.

18. A system according to claim 14, wherein said signal light is WDM signal light obtained by wavelength division multiplexing a plurality of optical signals having different wavelengths.

19. A system according to claim 18, wherein the wavelengths of said plurality of optical signals are arranged at unequal intervals.

20. A system according to claim 14, wherein:

said first optical fiber network includes a first fiber span for transmitting said signal light; and said second optical fiber network includes a second fiber span for-transmitting said converted signal light.

21. A system according to claim 20, wherein when each of said first and second fiber spans is virtually divided into the same number of sections, the product of the average of chromatic dispersions of a first one of said sections of said first fiber span and the length of said first one is substantially equal to the product of the average of chromatic dispersions of a second one of said sections of said second fiber span and the length of said second one, said first and second ones corresponding to each other in order as counted from said converter, and the product of the average of optical powers in said first one, the average of nonlinear coefficients in said first one, and the length of said first one is substantially equal to the product of the average of optical powers in said second one, the average of nonlinear coefficients in said second one, and the length of said second one.

22. A system according to claim 20, wherein:

the ratio of the product of an optical power and a nonlinear coefficient to a chromatic dispersion at a first point on said first fiber span is substantially equal to the ratio of the product of an optical power and a nonlinear coefficient to a chromatic dispersion at a second point on said second fiber span;

an accumulated value of chromatic dispersions measured from said converter to said first point being equal to an accumulated value of chromatic dispersions measured from said converter to said second point.

23. A system according to claim 20, wherein:

the ratio of the product of an optical power and a nonlinear coefficient to a chromatic dispersion at a first point on said first fiber span is substantially equal to the ratio of the product of an optical power and a nonlinear coefficient to a chromatic dispersion at a second point on said second fiber span;

an accumulated value of the products of optical powers and nonlinear coefficients measured from said converter to said first point being equal to an accumulated value of the products of optical powers and nonlinear coefficients measured from said converter to said second point.

24. A system according to claim 20, wherein the product of the average of chromatic dispersions of said first fiber span and the length of said first fiber span is substantially equal to the product of the average of chromatic dispersions of said second fiber span and the length of said second fiber span.

25. A system according to claim 20, wherein the product of the average of optical powers in said first fiber span, the average of nonlinear coefficients in said first fiber span, and the length of said first fiber span is substantially equal to the product of the average of optical powers in said second fiber span, the average of nonlinear coefficients in said second fiber span, and the length of said second fiber span.

26. A device comprising:
a polarization beam splitter having first, second, and third ports, said first and second ports being coupled by a first polarization plane, said first and third ports being coupled by a second polarization plane orthogonal to said first polarization plane; and
a polarization maintaining fiber having first and second ends, the first end connected to the second port and the second end connected to the third port, and having a polarization mode to be maintained between said first and second ends, said polarization maintaining fiber being supplied with signal light including first and second polarization components respectively having said first and second polarization planes, and with pump light;
said signal light being converted into converted signal light by nonlinear optical effect based on said signal light and pump light in said polarization maintaining fiber;
wherein said polarization mode to be maintained by said polarization maintaining fiber is given by a predetermined principal axis;
said first polarization plane of said signal light in said second port includes said predeterminged principal axis; and
said second polarization plane of said signal light in said third port includes said predetermined principal axis.

27. A system comprising:
first and second optical fiber networks each adapted to wavelength division multiplexing; and
a converter connected between said first and second optical fiber networks, said converter converting signal light into converted signal light by nonlinear optical effect based on said signal light and pump light, wherein said signal light is WDM signal light obtained by wavelength division multiplexing a plurality of optical signals having different wavelengths and arranged at unequal intervals, wherein
a set of said first and second optical fiber networks has normal or anomalous dispersion,
a zero dispersion point of one of said first and second optical fiber networks is near a wavelength of said pumping light,
a zero dispersion point of the other of said first and second optical networks is farther from the wavelength of said pumpling light than the zero dispersion point of the one of said first and second optical networks, and
influences of dispersion are substantially equal between near center channels of said first and second optical fiber networks.

28. A system comprising:
first and second optical fiber networks each adapted to wavelength division multiplexing wherein:
said first optical fiber network includes a first fiber span for transmitting said signal light; and
said second optical fiber network includes a second fiber span for transmitting said converted signal light; and
a converter connected between said first and second optical fiber networks, said converter converting signal light into converted signal light by nonlinear optical effect based on said signal light and pump light;
wherein when each of said first and second fiber spans is virtually divided into the same number of sections, the product of the average of chromatic dispersions of a first one of said sections of said first fiber span and the length of said first one is substantially equal to the product of the average of chromatic dispersions of a second one of said sections of said second fiber span and the length of said second one, said first and second ones corresponding to each other in order as counted according to distance from said converter, and the product of the average of optical powers in said first one, the average of nonlinear coefficients in said first one, and the length of said first one is substantially equal to the product of the average of optical powers in said second one, the average of nonlinear coefficients in said second one, and the length of said second one.

29. A system comprising:
first and second optical fiber networks each adapted to wavelength division multiplexing wherein:
said first optical fiber network includes a first fiber span for transmitting said signal light; and
said second optical fiber network includes a second fiber span for transmitting said converted signal light; and
a converter connected between said first and second optical fiber networks, said converter converting signal light into converted signal light by nonlinear optical effect based on said signal light and pump light;
wherein:
when each of said first and second fiber spans is virtually divided into the same number of a plurality of sections, the ratio of the product of an optical power and a nonlinear coefficient to a chromatic dispersion at a first one of said plurality of said sections of said first fiber span is substantially equal to the ratio of the product of an average of the optical power and an average of a nonlinear coefficient to a chromatic dispersion in a second one of said plurality of said sections of said second fiber span;
an accumulated value of chromatic dispersions measured from said converter to said first point being equal to an accumulated value of chromatic dispersions measured from said converter to said second point on said second one; and
said first and second ones corresponding to each other in order as counted according to distance from said converter.

30. A system comprising:
first and second optical fiber networks each adapted to wavelength division multiplexing wherein:
said first optical fiber network includes a first fiber span for transmitting said signal light; and
said second optical fiber network includes a second fiber span for transmitting said converted signal light; and a converter connected between said first and second optical fiber networks, said converter converting signal light into converted signal light by nonlinear optical effect based on said signal light and pump light;

wherein:

when each of said first and second fiber spans is virtually divided into the same number of a plurality of sections, the ratio of the product of an optical power and a nonlinear coefficient to a chromatic dispersion at a first point on said first one of said plurality of said sections of said first fiber span is substantially equal to the ratio of the product of an optical power and a nonlinear coefficient to a chromatic dispersion at a second point on a second one of said plurality of said sections of said second fiber span;

an accumulated value of the products of optical powers and nonlinear coefficients measured from said converter to said first point being equal to an accumulated value of the products of optical powers and nonlinear coefficients measured from said converter to said second point on said second one; and 31. A system comprising:

first and second optical fiber networks each adapted to wavelength division multiplexing wherein:
    said first optical fiber network includes a first fiber span for transmitting said signal light; and
    said second optical fiber network includes a second fiber span for transmitting said converted signal light; and a converter connected between said first and second optical fiber networks, said converter converting signal light into converted signal light by nonlinear optical effect based on said signal light and pump light;

wherein when each of said first and second fiber spans is virtually divided into the same number of a plurality of sections, the product of the average of chromatic dispersions of a second one of said plurality of said sections of and the length of said second one; and said first and second ones corresponding to each other in order as counted according to distance from said converter.

32. A system comprising:

first and second optical fiber networks each adapted to wavelength division multiplexing wherein:
    said first optical fiber network includes a first fiber span for transmitting said signal light; and
    said second optical fiber network includes a second fiber span for transmitting said converted signal light; and a converter connected between said first and second optical fiber networks, said converter converting signal light into converted signal light by nonlinear optical effect based on said signal light and pump light;

wherein when each of said first and second fiber spans is virtually divided into the same number of a plurality of sections, the product of the average of optical powers in a first one of said plurality of said first fiber span, the average of nonlinear coefficients in said first one, and the length of said first one is substantially equal to the product of the average of optical powers in said second one of said plurality of said sections of said second first fiber, the average of nonlinear coefficients in said second one, and the length of said second one; and said first and second ones corresponding to each other in order as counted according to distance from said converter.

33. A device comprising:

a polarization beam splitter having first, second, and third ports, said first port being supplied with signal light including first and second polarization components respectively having first and second polarization planes orthogonal to each other, and with pump light, said first and second ports being coupled by said first polarization plane, said first and third ports being coupled by said second polarization plane; and a polarization maintaining fiber having first and second ends, and having a polarization mode to be maintained between said first and second ends, said first end being optically connected to said second port so that said first polarization plane is adapted to said polarization mode, said second end being optically connected to said third port so that said second polarization plane is adapted to said polarization mode; and wherein signal light having said first polarization plane inputted to said first port is outputted from said first and second end, the second light outputted from said second end is outputted from said first port through said polarization beam splitter, signal light having said second polarization plane inputted to said first port is outputted from said first end, and the signal light outputted from said first end is outputted from said first port through said polarization beam splitter.

* * * * *

UNITED STATES PATENT AND TRADEMARK OFFICE
CERTIFICATE OF CORRECTION

| | |
|---|---|
| PATENT NO. | : 7,043,099 B1 |
| APPLICATION NO. | : 09/386847 |
| DATED | : May 9, 2006 |
| INVENTOR(S) | : Shigeki Watanabe |

It is certified that error appears in the above-identified patent and that said Letters Patent is hereby corrected as shown below:

Column 31, line 16 change "plan" to --plane--.

Column 31, line 29 inseret --a-- before "polarization".

Column 31, line 35 change "plan" to --plane--.

Column 32, line 16 change "signal-light" to --signal light--.

Column 32, line 31 change "for-transmitting" to --for transmitting--.

Column 33, line 40 change "predeterminged" to --predetermined--.

Column 33, line 62 change "pumpling" to --pumping--.

Column 34, line 8 after "into" insert --said--.

Column 34, line 12 after "of" insert --a plurality of--

Column 34, line 14 after "said" insert --plurality of said--.

Column 34, line 17 after "said" insert --plurality of said--.

Column 34, line 44 after "product of" insert --an average of--.

Column 34, line 53 after "to said" insert --to a--.

Column 34, line 53 after "point" insert --on said first one--.

Column 34, line 55 after "to" change "said" to --a--.

Column 35, line 10 after "on" change "said" to --a--.

Column 35, line 21 after "and" insert --said first and second ones corresponding to each other in order as counted according to distance from said converter.--

UNITED STATES PATENT AND TRADEMARK OFFICE
CERTIFICATE OF CORRECTION

PATENT NO. : 7,043,099 B1
APPLICATION NO. : 09/386847
DATED : May 9, 2006
INVENTOR(S) : Shigeki Watanabe It is certified that error appears in the above-identified patent and that said Letters Patent is hereby corrected as shown below:

Column 36, line 12 after "in" change "said" to --a--.

Column 36, line 15 alter "second" delete "first".

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,043,099 B1
APPLICATION NO. : 09/386847
DATED : May 9, 2006
INVENTOR(S) : Shigeki Watanabe It is certified that error appears in the above-identified patent and that said Letters Patent is hereby corrected as shown below:

Column 31, line 16 change "plan" to --plane--.

Column 31, line 29 insert --a-- before "polarization".

Column 31, line 35 change "plan" to --plane--.

Column 32, line 16 change "signal-light" to --signal light--.

Column 32, line 31 change "for-transmitting" to --for transmitting--.

Column 33, line 40 change "predeterminged" to --predetermined--.

Column 33, line 62 change "pumpling" to --pumping--.

Column 34, line 8 after "into" insert --said--.

Column 34, line 12 after "of" insert --a plurality of--

Column 34, line 14 after "said" insert --plurality of said--.

Column 34, line 17 after "said" insert --plurality of said--.

Column 34, line 44 after "product of" insert --an average of--.

Column 34, line 53 after "to said" insert --to a--.

Column 34, line 53 after "point" insert --on said first one--.

Column 34, line 55 after "to" change "said" to --a--.

Column 35, line 10 after "on" change "said" to --a--.

Column 35, line 21 after "and" insert --said first and second ones corresponding to each other in order as counted according to distance from said converter.--

UNITED STATES PATENT AND TRADEMARK OFFICE
CERTIFICATE OF CORRECTION

PATENT NO. : 7,043,099 B1
APPLICATION NO. : 09/386847
DATED : May 9, 2006
INVENTOR(S) : Shigeki Watanabe It is certified that error appears in the above-identified patent and that said Letters Patent is hereby corrected as shown below:

Column 36, line 12 after "in" change "said" to --a--.

Column 36, line 15 after "second" delete "first".

This certificate supersedes Certificate of Correction issued December 12, 2006.

Signed and Sealed this

Thirty-first Day of July, 2007

JON W. DUDAS
*Director of the United States Patent and Trademark Office*